(12) United States Patent
Ito

(10) Patent No.: US 9,937,764 B2
(45) Date of Patent: Apr. 10, 2018

(54) METHOD FOR PRODUCING PRESS-FORMED PRODUCT AND AUTOMOBILE LOWER ARM

(71) Applicant: NIPPON STEEL & SUMITOMO METAL CORPORATION, Tokyo (JP)

(72) Inventor: Yasuhiro Ito, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/301,755

(22) PCT Filed: Apr. 6, 2015

(86) PCT No.: PCT/JP2015/001919
§ 371 (c)(1),
(2) Date: Oct. 4, 2016

(87) PCT Pub. No.: WO2015/155974
PCT Pub. Date: Oct. 15, 2015

(65) Prior Publication Data
US 2017/0174028 A1 Jun. 22, 2017

(30) Foreign Application Priority Data

Apr. 11, 2014 (JP) .................................. 2014-082351
Apr. 11, 2014 (JP) .................................. 2014-082352

(51) Int. Cl.
*B60G 3/04* (2006.01)
*B60G 7/00* (2006.01)
(Continued)

(52) U.S. Cl.
CPC ............ *B60G 7/001* (2013.01); *B21D 22/26* (2013.01); *B21D 53/88* (2013.01);
(Continued)

(58) Field of Classification Search
CPC .. B60G 7/005; B60G 7/001; B60G 2204/416; B60G 2206/122; B60G 2206/8102;
(Continued)

(56) References Cited

U.S. PATENT DOCUMENTS 7,703,783 B2 * 4/2010 Miyawaki ................ B60G 7/02
280/124.134
8,398,102 B2 * 3/2013 Monchiero ............ B60G 7/001
280/124.125
(Continued)

FOREIGN PATENT DOCUMENTS

CN 101337495 1/2009
JP 06-087039 3/1994
(Continued)

*Primary Examiner* — Toan To
(74) *Attorney, Agent, or Firm* — Clark & Brody

(57) ABSTRACT

A press-formed product includes a main body part having a first end part and a second end part respectively on both ends, and a protruded part that protrudes outward of bending from a bent part of the main body part. On a surface of the top plate part of the main body part, a groove part is provided in a domain on the first end part side from a root of the protruded part. A first vertical wall part extending from the first end part of the main body part to the protruded part has a corner part connecting the main body part and the protruded part. An angle that is formed by a part which is on the main body part side from the corner part and a part which is on the protruded part side from the corner part is an acute angle.

9 Claims, 15 Drawing Sheets

(51) Int. Cl.
  *B21D 22/26* (2006.01)
  *B21D 53/88* (2006.01)
(52) U.S. Cl.
  CPC .. *B60G 2206/122* (2013.01); *B60G 2206/722* (2013.01); *B60G 2206/8102* (2013.01)
(58) Field of Classification Search
  CPC ...... B60G 2206/8201; B60G 2200/142; B60G 2206/10; B60G 2206/81; B60G 2206/811; B60G 2206/83; B21D 53/88; B21D 35/001
  USPC .................................. 280/124.134, 124.135
  See application file for complete search history.

(56) References Cited

U.S. PATENT DOCUMENTS

| | | | | |
|---|---|---|---|---|
| 8,690,176 B2* | 4/2014 | Perry | ..................... | B21D 53/88 280/124.134 |
| 2003/0006573 A1* | 1/2003 | Seki | ........... | B60G 3/20 280/124.135 |
| 2003/0034625 A1* | 2/2003 | Runte | ................... | B60G 7/001 280/124.134 |
| 2005/0225049 A1* | 10/2005 | Michel | ................... | B60G 7/001 280/124.134 |
| 2006/0175786 A1* | 8/2006 | Streubel | ................ | B60G 7/001 280/124.134 |
| 2010/0264615 A1* | 10/2010 | Guttilla | .................... | B60G 3/20 280/124.134 |
| 2014/0361508 A1* | 12/2014 | Ohta | ........................ | B60G 7/02 280/124.134 |
| 2015/0239313 A1* | 8/2015 | Verbowski | ........... | B21D 39/048 280/124.134 |
| 2015/0258869 A1* | 9/2015 | Haselhorst | ............... | B60G 3/06 280/124.134 |
| 2016/0114641 A1* | 4/2016 | Iwasawa | ................. | B29C 65/48 280/124.134 |
| 2016/0121679 A1* | 5/2016 | Meier | .................... | B60G 7/005 280/124.134 |

FOREIGN PATENT DOCUMENTS

| | | |
|---|---|---|
| JP | 2009-160655 | 7/2009 |
| JP | 2011-230189 | 11/2011 |
| WO | 2010/128540 | 11/2010 |

\* cited by examiner

METHOD FOR PRODUCING PRESS-FORMED PRODUCT AND AUTOMOBILE LOWER ARM

TECHNICAL FIELD

The present invention relates to a method for producing a press-formed product (example: an automobile lower arm) from a blank metal plate by press-working. Further, the present invention relates to an automobile lower arm (hereinafter, simply referred to as "a lower arm") produced by the production method.

BACKGROUND ART

In an automobile, vehicle wheels are mounted to a vehicle body via a suspension system (a suspension). One of members that constitute the suspension system is a lower arm. One end part of the lower arm is attached to the vehicle body via a frame (more specifically, a suspension member) of the suspension system. A vehicle wheel (more specifically, a wheel) is attached to the other end part of the lower arm. From the viewpoint of reduction in weight, it is desirable to adopt a press-formed product to the lower arm.

FIG. 1 and FIG. 2 are perspective views schematically showing shape examples of the press-formed products that are usable as lower arms. Among these Figures, FIG. 1 shows a press-formed product of a first example, and FIG. 2 shows a press-formed product of a second example. Press-formed products 10 shown in FIG. 1 and FIG. 2 each includes a main body part 11 and a protruded part 12. The main body part 11 extends in an L-shape or a bow-shape along a lengthwise direction in plan view. Of both ends of the main body part 11, one end part (hereinafter, also referred to as "a first end part") 11a is an end part that is attached to an automobile vehicle body. Hereinafter, the first end part 11a will also be referred to as "the vehicle body attaching end part". The other end part (hereinafter, also referred to as "a second end part") 11b is an end part that is attached to an automobile vehicle wheel. Hereinafter, the second end part 11b will also be referred to as "the vehicle wheel attaching end part". In each of FIG. 1 and FIG. 2, a side to be connected to the vehicle wheel will be designated by reference sign "W", whereas a side to be connected to a vehicle body will be designated by reference sign "B".

The protruded part 12 protrudes outward of bending from a bent part of the main body part 11. FIG. 1 and FIG. 2 each show an embodiment in which the protruded part 12 is provided substantially in a middle in the lengthwise direction of the main body part 11. As well as the first end part 11a of the main body part 11, the protruded part 12 is a part that is attached to an automobile vehicle body.

Sectional shapes of the main body part 11 and the protruded part 12 are both groove-shaped. That is, the main body part 11 and the protruded part 12 each include top plate parts 13a and 13b, and vertical wall parts 14a, 14b and 14c. The vertical wall parts 14a to 14c each extend from opposite sides of the top plate parts 13a and 13b. On a surface of the top plate part 13a of the main body part 11, a groove part 15 along the lengthwise direction of the main body part 11 is provided.

In a case of the press-formed product 10 of the first example shown in FIG. 1, the groove part 15 is provided in a domain on the first end part (the vehicle body attaching end part) 11a side from a root of the protruded part 12 in the surface of the top plate part 13a. That is, the groove part 15 is provided to a vicinity of the first end part 11a from a vicinity of the root of the protruded part 12. The groove part 15 becomes deeper toward the first end part 11a. Consequently, a bottom surface of the groove part 15 is an inclined surface. Note that the depth of the groove part is made constant without inclining the bottom surface of the groove part in some cases.

In the case of the press-formed product 10 of the second example shown in FIG. 2, the groove part 15 is provided in a domain from the first end part (the vehicle body attaching end part) 11a to the second end part (the vehicle wheel attaching end part) 11b so as to pass through the root of the protruded part 12, in the surface of the top plate part 13a of the main body part 11.

Among the vertical wall parts 14a to 14c, the vertical wall part 14a that extends from the first end part (the vehicle body attaching end part) 11a of the main body part 11 to the protruded part 12 has a bay-shaped corner part 16 that connects the main body part 11 and the protruded part 12. Hereinafter, the vertical wall part 14a will also be referred to as "the first vertical wall part". A ridge part 17 is formed by the first vertical wall part 14a and the top plate parts 13a, 13b (refer to the thick line portions in FIG. 1 and FIG. 2). In the ridge part 17, a portion overlaid on the corner part 16 is in a circular-arc shape. In the ridge part 17, an angle that is formed by a portion which is on the main body part 11 side from the corner part 16 and a portion which is on the protruded part 12 side from the corner part 16 is an acute angle.

Hereinafter, the vertical wall part 14b that extends from the first end part (the vehicle body attaching end part) 11a of the main body part 11 to the second end part (the vehicle wheel attaching end part) 11b of the main body part 11 will also be referred to as "the second vertical wall part". The vertical wall part 14c that extends from the second end part (the vehicle wheel attaching end part) 11b of the main body part 11 to the protruded part 12 will also be referred to as "the third vertical wall part".

The press-formed products 10 in the shapes as above are formed by applying press-working to blank metal plates. In accordance with necessity, restriking is applied to a region that cannot be formed by press-working, such as a very small R part, and thereby shape finish or shape fixation are performed. Further, for the purpose of finishing to a final shape, trimming, boring, welding and the like are applied in accordance with necessity.

When the lower arm as a press-formed product is produced, the type of forming that is applied to a blank metal plate is mainly stretch flanging. The prior arts concerning stretch flanging include the following.

Japanese Patent Application Publication No. 2011-230189 (Patent Literature 1) discloses a technique of performing press-working in a warm condition by heating a steel plate. In the technique of Patent Literature 1, a high-strength steel plate of a precipitation strengthening type is used as the steel plate, and performs press-working of the steel plate which is heated to a predetermined temperature T at an average forming speed of 200 mm/s or more. At this time, the heating temperature T of the steel plate and a softening temperature TL of the steel plate satisfy a relation of $TL-100 \leq T \leq TL$. Patent Literature 1 indicates that thereby, even when a high-strength steel plate which is difficult to subject to press-working is used as a starting material, a press-formed product can be produced without reducing production efficiency.

Japanese Patent Application Publication No. 2009-160655 (Patent Literature 2) discloses a technique for producing a press-formed product with a flange (a vertical wall part). In the technique of Patent Literature 2, as the blank metal plate, a blank is used, which is composed of a blank part for a substrate corresponding to a flat-shaped substrate, and a blank part for a concave-shaped flange that is bending-formed into a concave-shaped outer circumferential edge of the blank part for a substrate. The concave-shaped blank part is constituted of a blank part for a convex-shaped flange where stretch flanging deformation occurs, and a blank part for an adjacent flange that is adjacent to the blank part for a convex-shaped flange. An outer circumferential edge of the blank part for a convex-shaped flange is formed in a pre-determined range. Patent Literature 2 indicates that thereby, tensile stress concentration that occurs to the convex-shaped flange part of the press-formed product can be dispersed to both end portions, and a stretch flange crack can be suppressed.

Japanese Patent Application Publication No. 06-87039 (Patent Literature 3) discloses a technique of burring that forms a cylindrical part at a circumferential edge of a hole. In the technique of Patent Literature 3, drawing is performed by setting a draw radius to be large in a first step. In a subsequent second step, restriking is applied to the draw part formed in the first step, and an entire bottom part of the draw part is further pierced at a last stage of the work. Thereby, a vertical wall part of a remaining draw part by piercing of the bottom part directly becomes a cylindrical burring part, and stretch flanging is not needed. Patent Literature 3 indicates that consequently, even if the draw radius is set to be large, and a drawing height is enlarged to a work limit, a problem in forming such as a crack does not occur.

CITATION LIST

Patent Literatures

Patent Literature 1: Japanese Patent Application Publication No. 2011-230189
Patent Literature 2: Japanese Patent Application Publication No. 2009-160655
Patent Literature 3: Japanese Patent Application Publication No. 06-87039

SUMMARY OF INVENTION

Technical Problem

Conventionally, the lower arm of a press-formed product is produced by sequentially going through a first step and a second step as follows. In the first step, draw-forming is applied to a blank metal plate by press-working. In the second step, bending is applied to the metal plate which is draw-formed in the first step, by press-working.

FIG. 3A to FIG. 3C, and FIG. 4A to FIG. 4C each relates to a press-formed product usable as a lower arm, and each is a perspective view for explaining an example of a production process step of a conventional method. Among these Figures, FIG. 3A to FIG. 3C show a case of producing the press-formed product 10 of the first example shown in FIG. 1, and FIG. 4A to FIG. 4C show a case of producing the press-formed product 10 of the second example shown in FIG. 2. Further, FIG. 3A and FIG. 4A show shapes of respective blank metal plates. FIG. 3B and FIG. 4B show shapes of the metal plates after the respective first steps. FIG. 3C and FIG. 4C show shapes of the press-formed products obtained by going through the respective second steps. In order to obtain the press-formed products 10 in the shapes shown in FIG. 3C and FIG. 4C, trimming is sometimes performed in an upstream step or a downstream step of the second step.

FIG. 5 and FIG. 7 are perspective views schematically showing shape examples of a press die that is used in the first step of the conventional method. FIG. 6 and FIG. 8 are perspective views schematically showing shape examples of a press die that is used in the second step of the conventional method. Among these Figures, FIG. 5 and FIG. 6 each show the ease of producing the press-formed product of the first example shown in FIG. 1, and FIG. 7 and FIG. 8 each show the case of producing the press-formed product of the second example shown in FIG. 2.

When the press-formed product 10 of the first example shown in FIG. 1 is produced, a die 41a is used as an upper die 40a in the first step, as shown in FIG. 5. As a lower die 50a, a punch 51a and a blank holder 52a that are paired with the upper die 40a are used. The same applies to the case of producing the press-formed product 10 of the second example shown in FIG. 2, as shown in FIG. 7. FIG. 5 and FIG. 7 each show a shape of a front end part (a surface that abuts on the metal plate) with respect to the die 41a, and a shape of a front end part (a surface that abuts on the metal plate) with respect to the blank holder 52a, in order to make the configuration easily understandable.

In the case of producing the press-formed product 10 of the first example shown in FIG. 1, a die 41b and a pad 42b are used as an upper die 40b in the second step, as shown in FIG. 6. As a lower die 50b, a punch 51b which is paired with the upper die 40b is used. As shown in FIG. 8, the same applies to the case of producing, the press-formed product 10 of the second example shown in FIG. 2. FIG. 6 and FIG. 8 each show a shape of a front end part (a surface that abuts on the metal plate) with respect to the die 41b, and shows a shape of a front end part (a surface that abuts on the metal plate) with respect to the pad 42b, in order to make the configuration easily understandable.

As shown in FIG. 3A, FIG. 3B and FIG. 5, in the case of producing the press-formed product 10 of the first example shown in FIG. 1, press-working is applied to a blank metal plate 21 by using the die 41a, the punch 51a and the blank holder 52a in the first step by the conventional method, whereby a surface shape of a top plate part is formed throughout an entire range. Thereby, a groove part 15 is entirely formed. At the same time, the vertical wall part (the first vertical wall part) 14a is formed, which extends to the protruded part from the first end part (the vehicle body attaching end part) of the main body part, among the vertical wall parts. At this time, working of the blank metal plate 21 advances in a state in which an outer side of the first vertical wall part 14a is held by the blank holder 52a and the die 41a. A forming mode in the first step is draw-forming. The same applies to the case of producing the press-formed product 10 of the second example shown in FIG. 2, as shown in FIG. 4A, FIG. 4B and FIG. 7.

As shown in FIG. 3B, FIG. 3C and FIG. 6, in the case of producing the press-formed product 10 of the first example shown in FIG. 1, in the second step by the conventional method, press-working is applied to the metal plate 22 after the first step by using the die 41b, the pad 42b and the punch 51b. Thereby, the remaining vertical wall parts, that is, the second vertical wall part 14b and the third vertical wall part 14c are formed. At this time, in order to prevent a positional deviation of the metal plate 22, the working of the metal plate 22 advances in a state where a domain of the top plate part in the metal plate 22 is held by the pad 42b and the punch 51b. A forming mode in the second step is bending.

The same applies to the case of producing the press-formed product 10 of the second example shown in FIG. 2, as shown in FIG. 4B, FIG. 4C and FIG. 8.

When a press-formed product is produced by the conventional method as above, rupture may occur in the first step or the second step. In the first step or the second step, the rupture occurs to a part 22c (hereinafter, also referred to as "a stretch flanging deformation part") that undergoes stretch flanging deformation.

The stretch flanging deformation part 22c corresponds to a corner part 16 that connects the main body part and the protruded part in the first vertical wall part 14a, and an outer side domain 22h of the corner part 16 (refer to shaded portions in FIG. 3B and FIG. 4B).

In the first step according to the conventional method, inflow of the material from the top plate part to the stretch flanging deformation part 22c is promoted by using the blank holder 52a, and stretch flanging deformation is reduced. However, even though countermeasure like this is applied, rupture may occur to the stretch flanging deformation part 22c.

In this respect, in the technique of Patent Literature 1 described above, in order to enhance stretch flanging performance, a high-strength steel plate of a precipitation strengthening type is used as a steel plate, and press-working is performed in a warm condition. However, in this technique, the step of heating the steel plate is required, and therefore, productivity is reduced as compared with press-working in a cold condition.

In the technique of Patent Literature 2, by optimizing the shape of the blank metal plate, stress concentration that occurs to the region which undergoes stretch flanging deformation is dispersed, and a stretch flange crack is suppressed. However, there is a limitation on dispersion of stress concentration by optimization of the shape of the starting material, and suppression of rupture in the stretch flanging deformation part is insufficient.

In the technique of Patent Literature 3 described above, burring is used. A draw part which is formed by the burring is in an axisymmetric cylindrical shape. Meanwhile, a stretch flanging deformation part of the lower arm is not in an axisymmetric shape. Consequently, even if inflow of the material is promoted by drawing, a crack may occur to the stretch flanging deformation part.

The present invention is made in the light of the above described circumstances, and an objective of the present invention is to provide a method for producing a press-formed product that reduces stretch flanging deformation in a stretch flanging deformation part, and can restrain rupture in the stretch flanging deformation part, at a time of producing the press-formed product in a shape conforming to an automobile lower arm. Further, an objective of the present invention is to provide an automobile lower arm with high strength in which rupture is suppressed in the stretch flanging deformation part.

Solution to Problem

A method for producing a press-formed product according to one embodiment of the present invention is a method for producing a press-formed product from a blank metal plate.

The press-formed product includes a main body part that bends along a lengthwise direction in plan view and has a first end part and a second end part respectively on both ends of the main body part, and a protruded part that protrudes outward of bending from a bent part of the main body part.

The main body part and the protruded part each include top plate parts and vertical wall parts each extending from opposite sides of the top plate parts.

A groove part along the lengthwise direction of the main body part is provided on a surface of the top plate part of the main body part.

Among the vertical wall parts, the vertical wall part extending from the first end part of the main body part to the protruded part has a corner part connecting the main body part and the protruded part.

In a ridge part formed by the top plate part and the vertical wall part extending from the first end part of the main body part to the protruded part, an angle that is formed by a part which is on the main body part side from the corner part and a part which is on the protruded part side from the corner part is an acute angle.

The method for producing the press-formed product includes a first step; and a second step.

In the first step, by applying press-working to the blank metal plate, a surface shape on the second end part side from the bent part of the main body part is formed, in a surface shape of the top plate part, and further the vertical wall part extending from the first end part side of the main body part to the protruded part is formed.

In the second step, a surface shape on the first end part side from the bent part of the main body part is formed, in the surface shape of the top plate part, by applying press-working to the blank metal plate after the first step.

In the above described production method, the following configuration can be adopted.

The groove part of the press-formed product is provided in a domain from the first end part to the second end part so as to pass through a root of the protruded part, in the surface of the top plate part of the main body part.

In the first step, a part on the second end part side of the groove part is formed.

In the second step, a part on the first end part side of the groove part is formed.

In the case of the production method, in the first step, when a circle having a radius of 35% of a length of the main body part is drawn centered at a point that is located nearest to the second end part side in the corner part, a part or a whole of a portion on the second end part side of the groove part is preferably located in the circle.

Further, in the above described production method, the following configuration can be adopted.

The groove part of the press-formed product is provided in a domain on the first end part side from a root of the protruded part, in the surface of the top plate part of the main body part, The groove part is not formed in the first step.

The groove part is formed in the second step.

In any one of the production methods described above, the following configuration can be adopted.

The press-formed product is an automobile lower arm.

The first end part and the protruded part of the main body part are attached to a vehicle body of an automobile.

The second end part of the main body part is attached to a vehicle wheel of the automobile.

An automobile lower arm according to one embodiment of the present invention is formed from a blank metal plate by press-working.

The lower arm includes a main body part that bends along a lengthwise direction in plan view and has a vehicle body attaching end part and a vehicle wheel attaching end part respectively on both ends of the main body part, and a vehicle body attaching protruded part that protrudes outward of bending from a bent part of the main body part.

The main body part and the protruded part each include top plate parts and vertical wall parts each extending from opposite sides of the top plate parts.

A groove part along the lengthwise direction of the main body part is provided on a surface of the top plate part of the main body part.

Among the vertical wall parts, the vertical wall part extending from the vehicle body attaching end part of the main body part to the protruded part has a corner part connecting the main body part and the protruded part.

In a ridge part formed by the vertical wall part extending from the vehicle body attaching end part of the main body part to the protruded part, and the top plate part, an angle that is formed by a part which is on the main body part side from the corner part and a part which is on the protruded part side from the corner part is an acute angle.

A tensile strength TS [MPa] is 440 MPa or more.

A maximum height $H_{max}$ [mm] of the corner part of the vertical wall part satisfies Formula (1) as follows:

$$H_{max} > -0.0103 \times TS + 26.051 \quad (1)$$

Advantageous Effects of Invention

The method for producing a press-formed product of the present invention can reduce stretch flanging deformation in a stretch flanging deformation part, and restrain rupture in the stretch flanging deformation part, by going through the first step and the second step at the time of producing the press-formed product in the shape conforming to an automobile lower arm. Further, the automobile lower arm of the present invention has high strength, with rupture suppressed in the stretch flanging deformation part.

DESCRIPTION OF EMBODIMENTS

In order to achieve the above described objectives, the present inventor has conducted various analyses and tests, and kept earnest studies. As a result, the present inventor has obtained the following finding. When a press-formed product in a shape conforming to a lower arm, that is, a press-formed product including a main body part and a protruded part and provided with a groove part on a surface of a top plate part is produced by press-working, if a shape of a press die is optimized in a first step, inflow of a material to a stretch flanging deformation part is further promoted. Thereby, stretch flanging deformation in the stretch flanging deformation part is reduced, and rupture in the stretch flanging deformation part is suppressed. As a result, it becomes possible to produce a press-formed product (a lower arm) in which rupture is suppressed in the stretch flanging deformation part.

More specifically, irrespective of an installation range of the groove part, in the first step, a surface shape on a second end part side from a bent part of the main body part in a surface shape of the top plate part is formed without forming a surface shape on a first end part side from the bent part of the main body part, and a vertical wall part that extends from the first end part side of the main body part to the protruded part can be further formed. Subsequently, in a second step, the surface shape on the first end part side from the bent part of the main body part, in the surface shape of the top plate part can be formed. When the press-formed product is a lower arm, the first end part is a vehicle body attaching end part, and the second end part is a vehicle wheel attaching end part.

For example, in a case of producing a press-formed product in which a groove part is provided in only a domain on the first end part side from the bent part of the main body part, the groove part is not formed in the first step, but the groove part is formed in the second step. Further, in a case of producing a press-formed product in which a groove part is provided in a domain from the first end part to the second end part, a part on the second end part side of the groove part is formed in the first step, and a remaining part (the part on the first end part side) of the groove part is formed in the second step.

Hereinafter, embodiments of the present invention will be described with reference to Figures. Here, a case where the press-formed product is a lower arm will be illustrated.

[First Embodiment]

Figure 1:
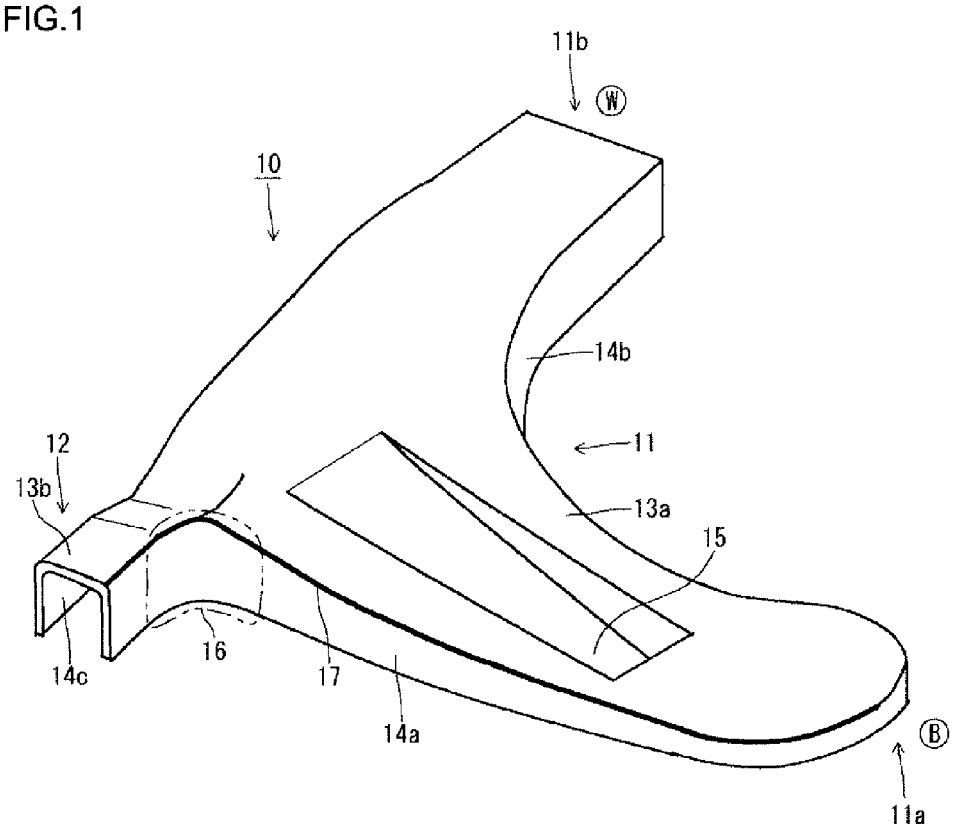
FIG. 1 is a perspective view schematically showing a press-formed product of a first example.
Figure 9A:
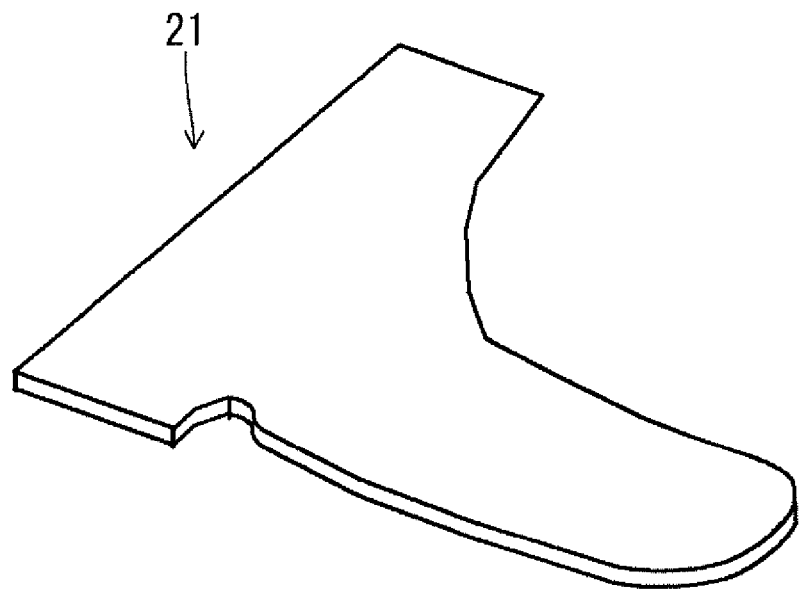
FIG. 9A is a perspective view for explaining an example of a production process step of a first embodiment, and shows a shape of a blank metal plate.
Figure 9B:
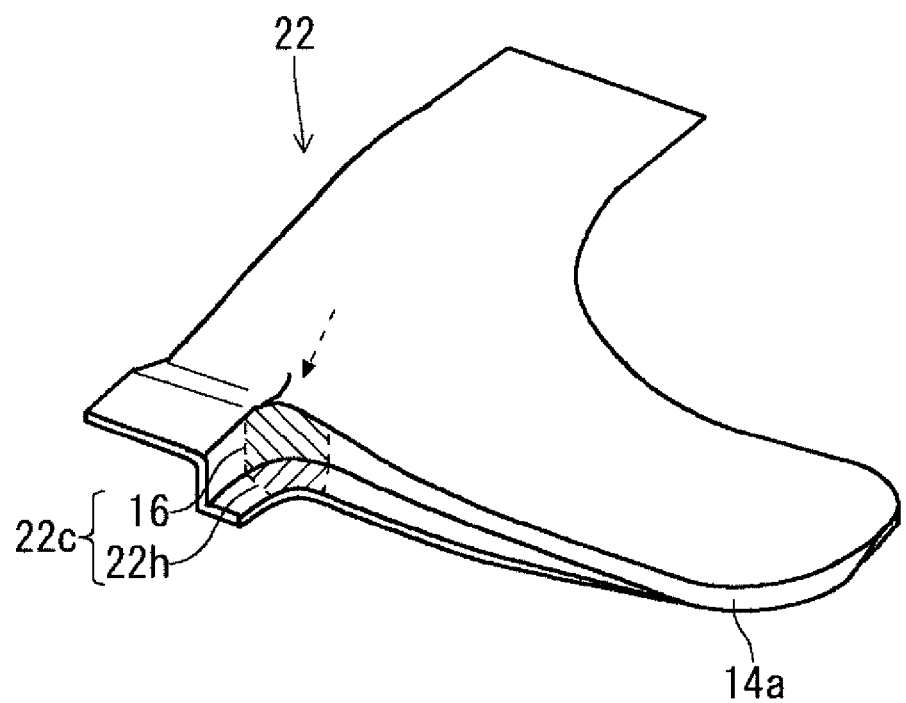
FIG. 9B is a perspective view for explaining an example of the production process step of the first embodiment, and shows a shape of the metal plate after a first step.
Figure 9C:
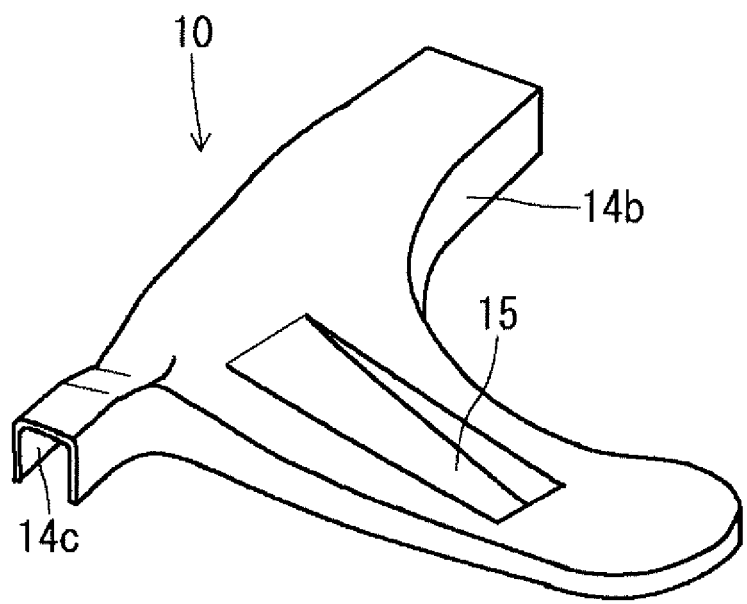
FIG. 9C is a perspective view for explaining an example of the production process step of the first embodiment, and shows a shape of a press-formed product obtained by going through a second step.

FIG. 9A to FIG. 9C relate to a press-formed product usable as a lower arm, and are perspective views explaining an example of a production process step according to a production method of a first embodiment. Among these Figures, FIG. 9A shows a shape of a blank metal plate. FIG. 9B shows a shape of the metal plate after a first step. FIG. 9C shows a shape of the press-formed product obtained by going through a second step. The production method of the first embodiment is applied to a case of producing a press-formed product 10 of a first example shown in FIG. 1. A groove part 15 of the press-formed product 10 is provided in only a domain on a first end part (a vehicle body attaching end part) 11a side from a root of a protruded part 12, in a surface of a top plate part 13a of a main body part 11, as shown in FIG. 1 and FIG. 9C. In order to obtain the press-formed product 10 in a shape shown in FIG. 9C, trimming is sometimes performed in an upstream process or a downstream process of a second step.

Figure 10:
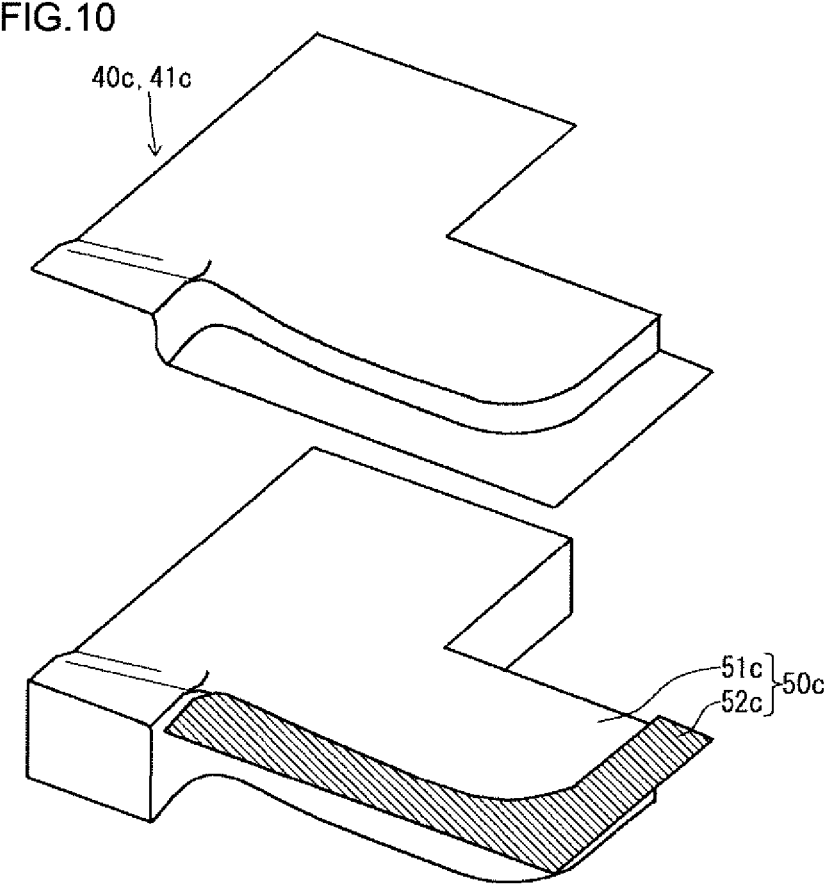
FIG. 10 is a perspective view schematically showing a shape example of a press die that is used in the first step of the first embodiment.

FIG. 10 is a perspective view schematically showing a shape example of a press die that is used in the first step in the production method of the first embodiment. As shown in FIG. 10, in the first step, a die 41c is used as an upper die 40c. As a lower die 50c, a punch 51c and a blank holder 52c that are paired with the upper die 40c are used. In order to make a configuration easily understandable, FIG. 10 shows a shape of a front end part (a surface that abuts on the metal plate) with respect to the die 41c, and shows a shape of a front end part (a surface that abuts on the metal plate), with respect to the blank holder 52c.

Figure 6:
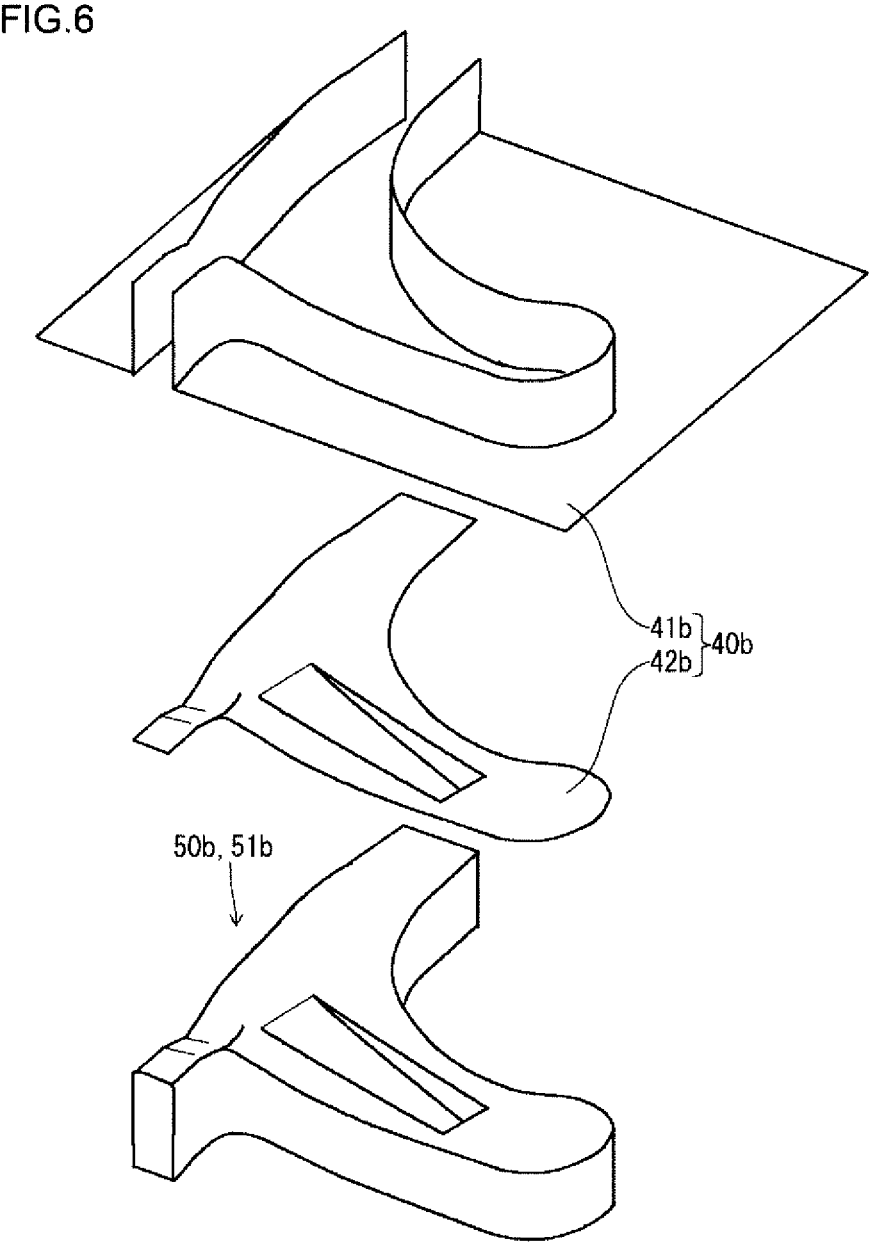
FIG. 6 relates to the press-formed product of the first example, and is a perspective view schematically showing a shape example of a press die that is used in the second step of the conventional method.

In the second step, a press die shown in FIG. 6 described above is used as in the second step of the conventional method. That is, as shown in FIG. 6 described above, a die 41b and a pad 42b are used as an upper die 40b. As a lower die 50b, a punch 51b which is paired with the upper die 40b is used.

As shown in FIG. 9A, FIG. 9B and FIG. 10, in the first step, by applying press-working to a blank metal plate 21 by using the die 41c, the punch 51c and the blank holder 52c, a surface shape on the second end part side from the bent part of the main body part is formed, in the surface shape of the top plate part. In the press-formed product 10 which is a target in the first embodiment, the groove part 15 is not present on the surface of the top plate part 13a on the second end part 11b side (refer to FIG. 1). Consequently, the groove part 15 is not formed, as shown in FIG. 9B. At the same time, a vertical wall part (a first vertical wall part) 14a that extends to the protruded part from the first end part (the vehicle body attaching end part) of the main body part in the vertical wall parts is formed. At this time, working of the blank metal plate 21 advances in a state where the outer side of the first vertical wall part 14a is held by the blank holder 52c and the die 41c. A forming mode in the first step is draw-forming.

As shown in FIG. 6, FIG. 9B and FIG. 9C, in the second step, a surface shape on the first end part side from the bent part of the main body part is formed, in the surface shape of the top plate part, by applying press-working to a metal plate 22 after the first step, by using the die 41b, the pad 42b and the punch 51b similarly to the second step of the conventional method. Thereby, as shown in FIG. 9C, the groove part 15 is formed. At the same time, the remaining vertical wall parts, that is, a second vertical wall part 14b and a third vertical wall part 14c are formed. At this time, in order to prevent a positional deviation of the metal plate 22, the working of the metal plate 22 advances in a state where a domain of the top plate part in the metal plate 22 is held by the pad 42b and the punch 51b. A forming mode in the second step is bending.

Here, in the conventional method, in the first step, the vertical wall part 14a is formed with the groove part 15, as described above. At this time, the material in the domain on the second end part (the vehicle wheel attaching end part) side from a root of the protruded part in the top plate part of the main body part is brought into both the groove part 15 and the stretch flanging deformation part 22c (refer to the broken line arrows in FIG. 3B described above). By the bringing of the material to the groove part 15, the bringing of the material to the stretch flanging deformation part 22c is reduced.

In contrast with this, in the first embodiment, in the first step, the first vertical wall part 14a is formed without forming the groove part 15. At this time, a material in a domain on the second end part (the vehicle wheel attaching end part) side from the root of the protruded part in the top plate part of the main body part is brought into only the stretch flanging deformation part 22c (refer to the broken line arrow in FIG. 9B). Since there is no bringing of the material into the groove part 15, bringing of the material to the stretch flanging deformation part 22c is further promoted. As a result, the stretch flanging deformation in the stretch flanging deformation part 22c is reduced, and rupture in the stretch flanging deformation part is suppressed. Accordingly, it becomes possible to produce a press-formed product (the lower arm) in which rupture is suppressed in the stretch flanging deformation part.

As described above, suppression of rupture in the stretch flanging deformation part by the production method of the first embodiment is by the bringing of the material in the first step. A mechanism of the suppression of rupture similarly applies to the second step.

According to the production method of the first embodiment, stretch flanging deformation in the stretch flanging deformation part is reduced as described above. Consequently, even in the case of using a high-tensile strength steel plate as the blank metal plate, rupture in the stretch flanging deformation part can be suppressed. Further, it becomes possible to more increase a forming height of a vertical wall part, in particular, a forming height of a corner part of the first vertical wall part to be the stretch flanging deformation part, and a degree of freedom of design of the press-formed product (the lower arm) is enhanced.

In the case of using a high-tensile strength steel plate as the blank metal plate, if the tensile strength becomes more than 440 MPa, occurrence of rupture in the stretch flanging deformation part becomes remarkable. In this respect, according to the production method of the first embodiment, rupture in the stretch flanging deformation part can be suppressed even in the case of using the high-tensile strength steel plate with a tensile strength of 440 MPa or more. Consequently, the production method of the first embodiment is especially useful in the case of using a high-tensile strength steel plate with a tensile strength of 440 MPa or more. Thereby, a press-formed product (a lower arm) with a high strength and a high rigidity in which rupture is suppressed in the stretch flanging deformation part is obtained.

The production method of the first embodiment described above can be changed as follows.

Forming of the vertical wall part (the second vertical wall part) 14b extending from the first end part (the vehicle body attaching end part) of the main body part to the second end part (the vehicle wheel attaching end part) of the main body part may be performed in either of the first step and the second step. Further, if a downstream step of applying press-working by using another press die is provided subsequently to the second step, forming of the second vertical wall part 14b can be performed in the downstream step. From the viewpoint of further promoting inflow of the material to the stretch flanging deformation part 22c in the first step, forming of the second vertical wall part 14b is preferably performed in the second step or the downstream step of the second step.

Forming of the vertical wall part (the third vertical wall part) 14c extending to the protruded part from the second end part (the vehicle wheel attaching end part) of the main body part may be performed in either of the first step and the second step. Further, a downstream step of applying press-working by using another press die is provided subsequently to the second step, forming of the third vertical wall part 14c can be performed in the downstream step. From the viewpoint of further promoting inflow of the material to the stretch flanging deformation part 22c in the first step, forming of the third vertical wall part 14c is preferably performed in the second step or the downstream step of the second step.

In the second step, the pad can be omitted, as the upper die which is paired with the punch. Press-working in this case is performed by the die and the punch. However, in this case, in order to form the groove part 15, a convex part corresponding to the groove part 15 needs to be provided in the die. Further, in order to prevent the position of the metal plate from deviating at the time of press-working, a guide pin is preferably installed.

In fact, if the pad 42b is used in the second step, forming of the groove part 15 precedes forming of the second vertical wall part 14b and the third vertical wall part 14e. Thereby, inflow of the material toward the groove part 15 from a region that is formed into the second vertical wall part 14b is promoted. As a result, outflow of the material from the stretch flanging deformation part 22c is more reduced, so that stretch flanging deformation in the stretch flanging deformation part 22c is more reduced, and rupture in the stretch flanging deformation part 22c is more suppressed. Consequently, use of the pad is preferable in the second step.

The first step and the second step may be continued, or in accordance with necessity, another step (example: a piercing step, a trimming step or the like) may be added to between the first step and the second step.

Trimming is not indispensable. This is because if the outline shape of the blank metal plate is set properly, the shape of the press-formed product which is obtained by going through the first step and the second step can be formed into the product shape.

[Second Embodiment]

Figure 2:
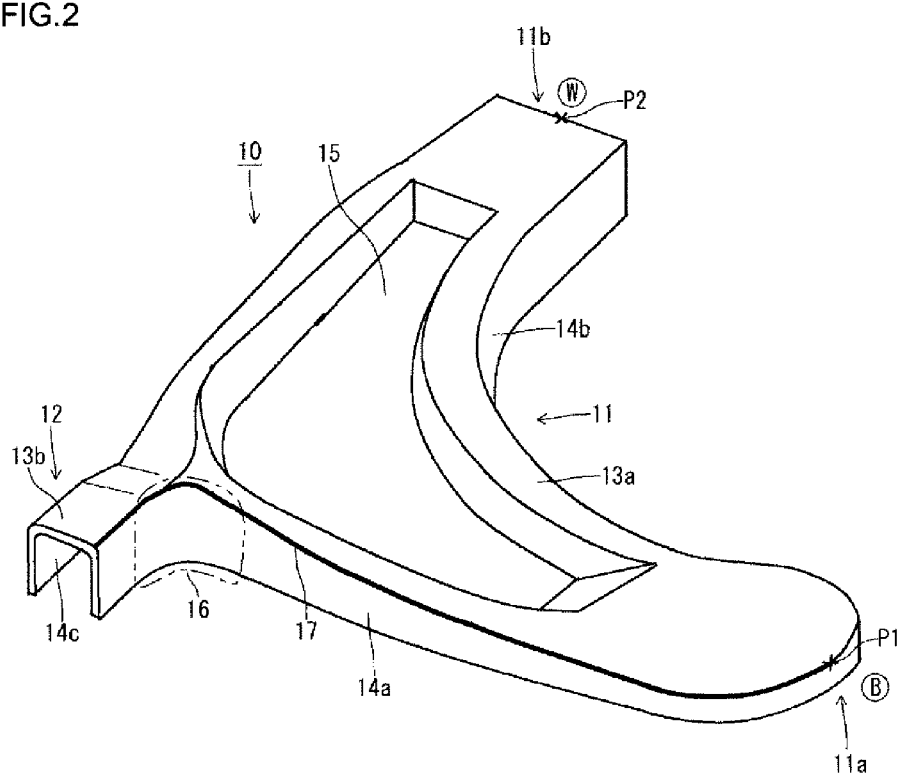
FIG. 2 is a perspective view schematically showing a press-formed product of a second example.
Figure 11A:
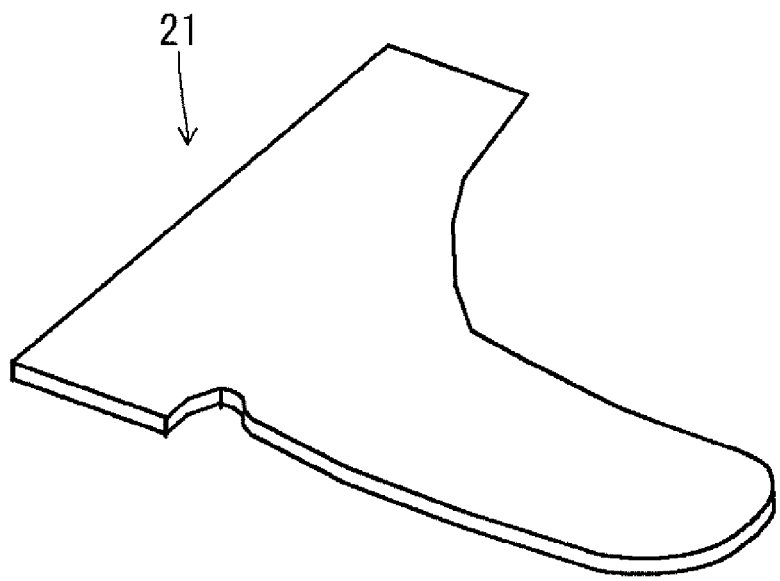
FIG. 11A is a perspective view for explaining an example of a production process step of a second embodiment, and shows a shape of a blank metal plate.
Figure 11B:
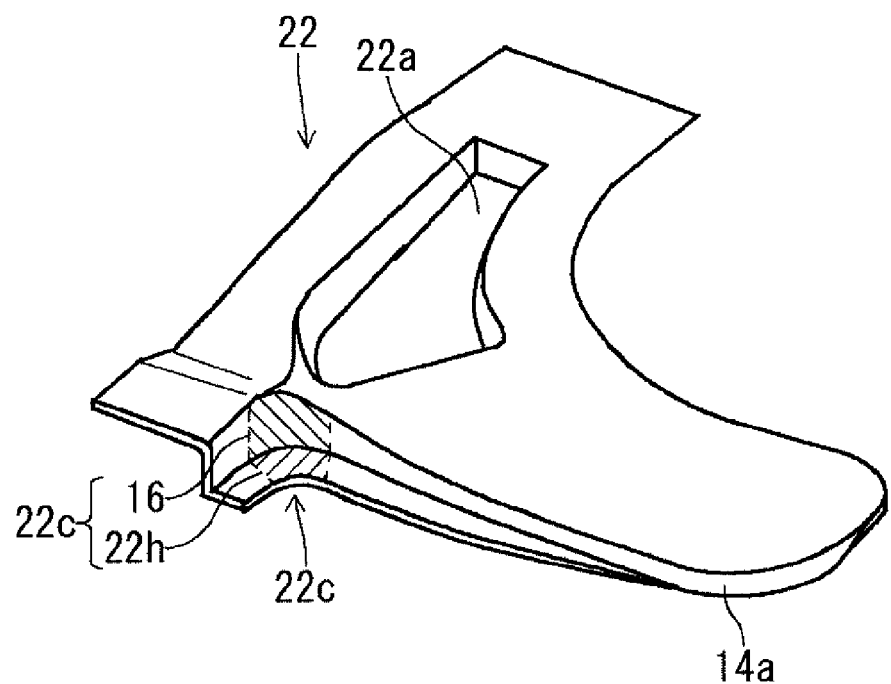
FIG. 11B is a perspective view for explaining an example of the production process step of the second embodiment, and shows a shape of the metal plate after the first step.
Figure 11C:
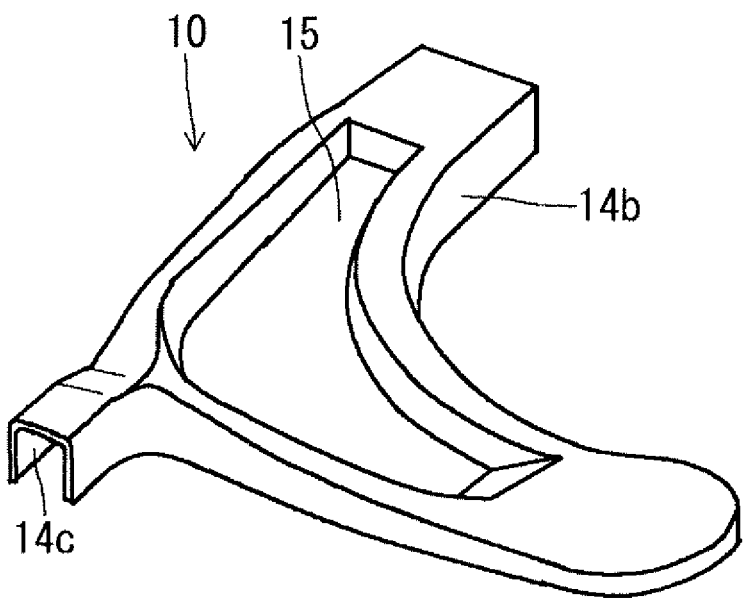
FIG. 11C is a perspective view for explaining an example of the production process step of the second embodiment, and shows a shape of a press-formed product obtained by going through a second step.
Figure 12:
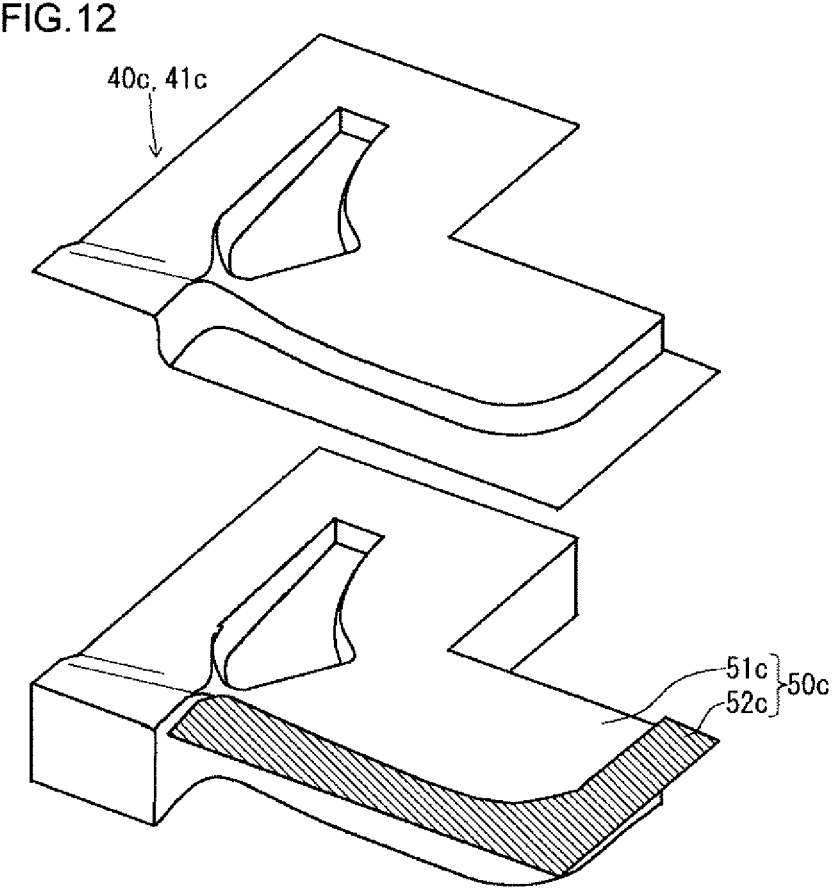
FIG. 12 is a perspective view schematically showing a shape example of a press die that is used in the first step of the second embodiment.

FIG. 11A to FIG. 11C relate to a press-formed product usable as a lower arm, and are perspective views each explaining an example of a production process step according to a production method of a second embodiment. Among these Figures, FIG. 11A shows a shape of a blank metal plate. FIG. 11B shows a shape of a metal plate after a first step. FIG. 11C shows a shape of the press-formed product obtained by going through a second step. FIG. 12 is a perspective view schematically showing a shape example of a press die that is used in the first step in the production method of the second embodiment. The production method of the second embodiment is applied to a case of producing the press-formed product 10 of the second example shown in FIG. 2. As shown in FIG. 2 and FIG. 11C, the groove part 15 of the press-formed product 10 is provided in a wide-ranging domain from the first end part (the vehicle body attaching end part) 11a to the second end part (the vehicle wheel attaching end part) 11b so as to pass through the root of the protruded part 12, in a surface of the top plate part 13a of the main body part 11.

The second embodiment is based on the configuration of the aforementioned first embodiment. Hereinafter, explanation overlapping with the first embodiment will be properly omitted.

As shown in FIG. 11A, FIG. 11B and FIG. 12, in a first step, a surface shape on a second end part side from a bent part of a main body part is formed, in a surface shape of a top plate part, by applying press-working to the blank metal plate 21 by using the die 41c, the punch 51c and the blank holder 52c. Thereby, as shown in FIG. 11B, a part (hereinafter, also referred to as "a second-end-part-side groove part") 22a on the second end part (the vehicle wheel attaching end part) 11b side of the groove part 15 is formed. At the same time, the vertical wall part (the first vertical wall part) 14a extending to a protruded part from a first end part (a vehicle body attaching end part) of the main body part, in the vertical wall parts, is formed.

Figure 8:
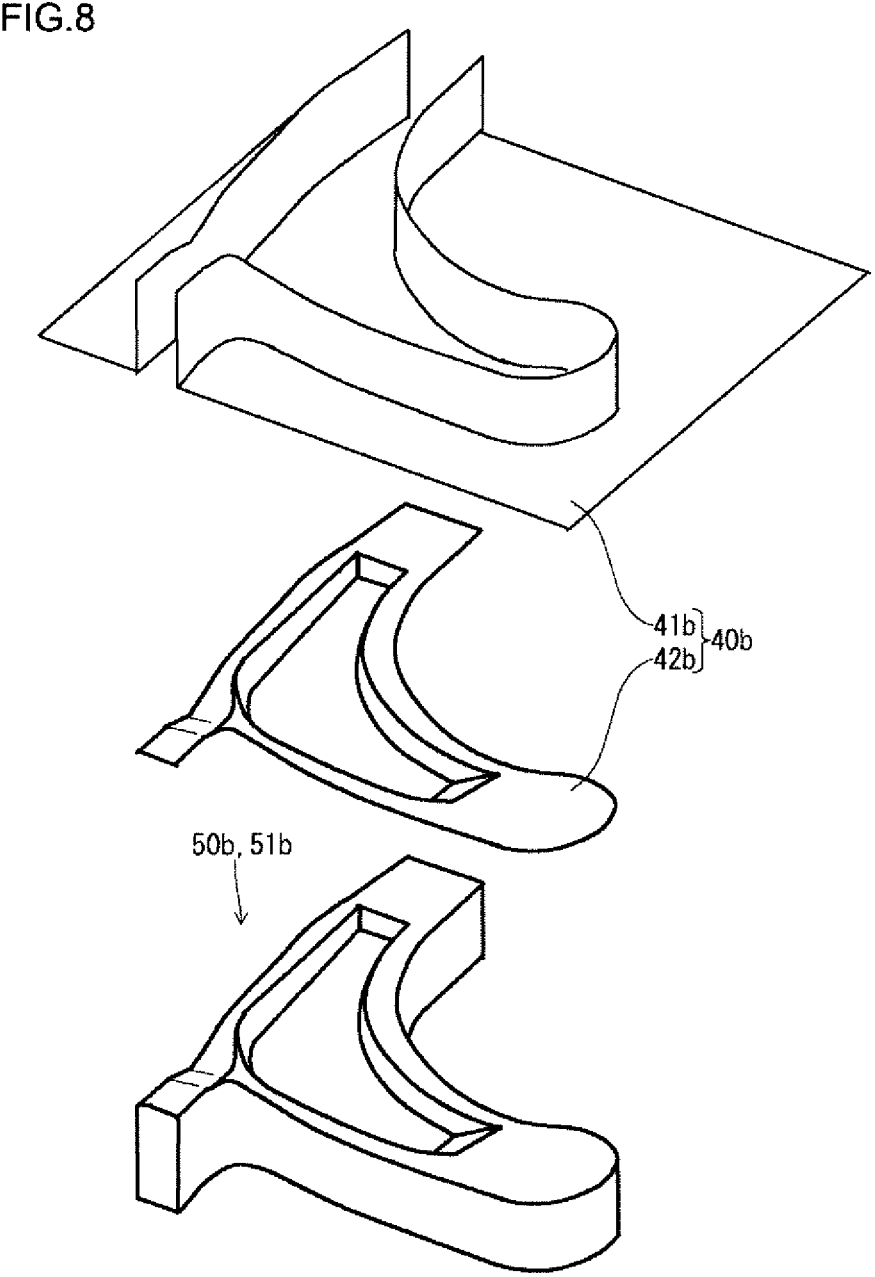
FIG. 8 relates to the press-formed product of the second example, and is a perspective view schematically showing a shape example of a press die that is used in the second step of the conventional method.

In a second step, the press die shown in FIG. 8 described above is used as in the second step of the conventional method. As shown in FIG. 8, FIG. 11B and FIG. 11C, in the second step, a surface shape on a first end part side from the bent part of the main body part is formed, in the surface shape of the top plate part, by applying press-working to the metal plate 22 after the first step, by using the die 41b, the pad 42b and the punch 51b. Thereby, as shown in FIG. 11C, a remaining part (hereinafter, also referred to as "a first-end-part-side groove part") of the groove part 15 is formed.

At the same time, remaining vertical wall parts, that is, the second vertical wall part 14b and the third vertical wall part 14c are formed.

Here, a mechanism of rupture in the stretch flanging deformation part 22c being suppressed by the production method of the second embodiment will be described.

Figure 13A:
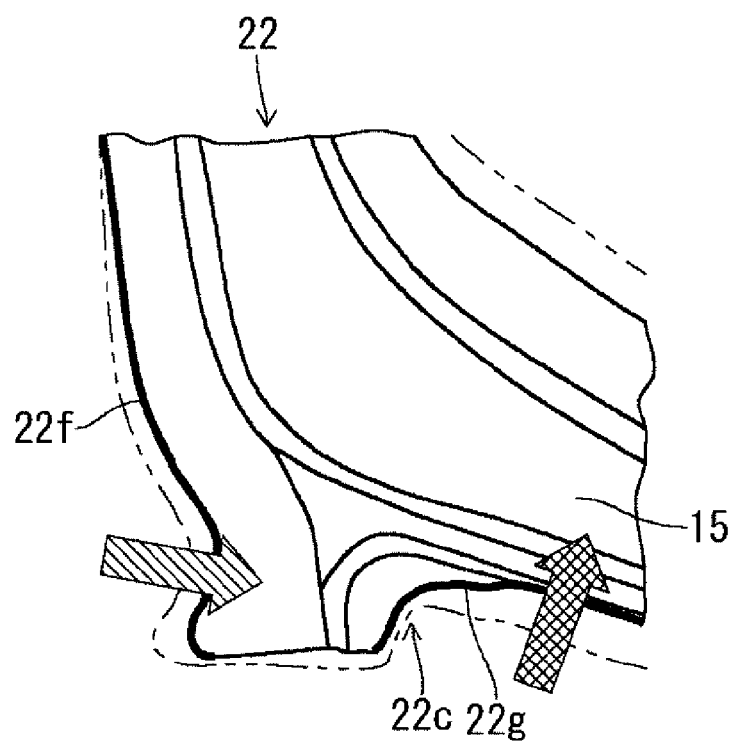
FIG. 13A is a plane view showing a flow state of a material of a stretch flanging deformation part in the first step, and shows a case by the conventional method.
Figure 13B:
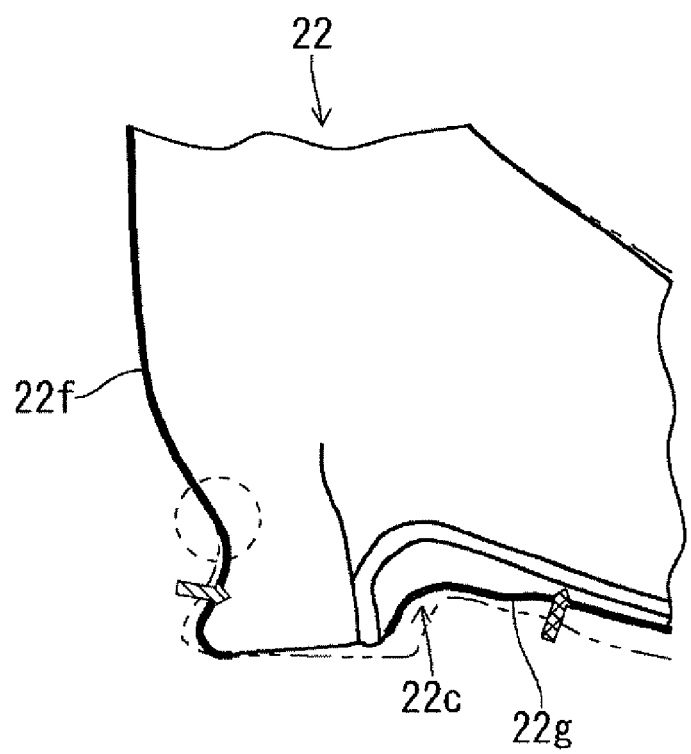
FIG. 13B is a plan view showing a flow state of a material of a stretch flanging deformation part in the first step, and shows a case by a comparative method.
Figure 13C:
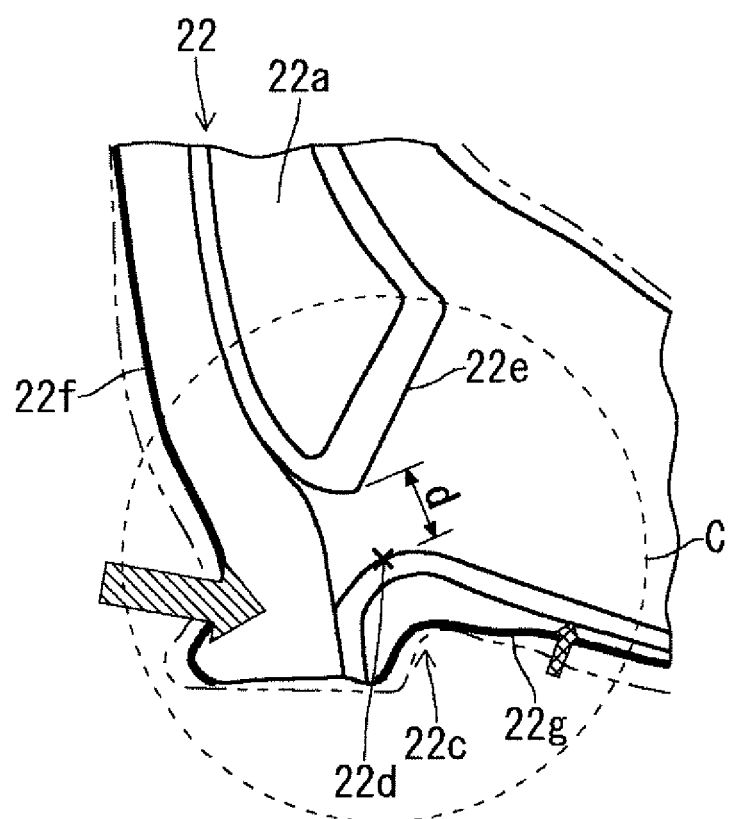
FIG. 13C is a plan view showing a flow state of a material of a stretch flanging deformation part in the first step, and shows a case according to the second embodiment.

FIG. 13A to FIG. 13C are plan views each showing a flow state of a material of a stretch flanging deformation part in the first step. Among these Figures, FIG. 13A shows a case according to the conventional method. FIG. 13B shows a case according to a comparative method. FIG. 13C shows a case according to the second embodiment. These Figures each show a shape of the stretch flanging deformation part 22c and a periphery thereof in the metal plate 22 after the first step. Shapes of the blank metal plates are shown by the two-dot chain lines.

As shown in FIG. 13A, in the conventional method, the entire groove part 15 from the first end part to the second end part is formed in the first step. Consequently, an outer edge 22f (refer to the thick line portion in FIG. 13A) of a part that is formed into the third vertical wall part in the second step moves to the groove part 15 side and the stretch flanging deformation part 22c side. That is, in the first step of the conventional method, the material flows to the arrow to which shading is applied in FIG. 13A, and the material flows into the stretch flanging deformation part 22c.

Meanwhile, the outer edge 22g (refer to the thick line portion in FIG. 13A) of the first vertical wall part moves to the groove part 15 side. Consequently, in the first step of the conventional method, the material flows to the direction shown by the arrow to which cross-hatching is applied in FIG. 13A, and the material flows out from the stretch flanging deformation part 22c. By outflow of the material from the stretch flanging deformation part 22c, deformation in the stretch flange deformation part 22c increases, where rupture occurs.

The comparative method is a method for reference which does not form the groove part 15 in the first step, as shown in FIG. 13B. In the comparative method, shearing deformation advances in a domain enclosed by the broken line in FIG. 13B, at the time of the material flowing into the stretch flanging deformation part 22c. Since deformation resistance of the shearing deformation is large, inflow of the material to the stretch flanging deformation part 22c is inhibited. As a result, the outer edge 22f (refer to the thick line portion in FIG. 13B) of a part which is to be formed into the third vertical wall part in the second step moves to the stretch flanging deformation part 22c side, but a moving amount of the outer edge 22f decreases as compared with the conventional method. That is, inflow of the material to the stretch flanging deformation part 22c is reduced.

Meanwhile, the outer edge 22g (refer to the thick line portion in FIG. 13B) of the first vertical wall part moves inward. However, since a groove part is not formed in the first step of the comparative method, a moving amount of the outer edge 22g decreases as compared with the conventional method. Consequently, according to the comparative method, outflow of the material from the stretch flanging deformation part 22c is reduced as compared with the conventional method.

As above, in the comparative method, inflow of the material to the stretch flanging deformation part 22c in the direction shown by the arrow to which shading is applied in FIG. 13B is reduced as compared with the conventional method. Further, outflow of the material from the stretch flanging deformation part 22c in the direction shown by the arrow to which cross-hatching is applied in FIG. 13B is reduced. As a result, deformation in the stretch flanging deformation part 22c increases more, and occurrence of rupture in this part becomes remarkable.

In contrast with this, in the second embodiment, only the second-end-part-side groove part 22a of the groove part is formed in the first step, as shown in FIG. 13C. In this case, the material flows into the second-end-part-side groove part 22a and the stretch flanging deformation part 22c. The material flows into the second-end-part-side groove part 22a, whereby occurrence of sharing deformation as in the comparative method is prevented, and inflow of the material to the stretch flanging deformation part 22e is promoted. Consequently, the outer edge 22f (refer to the thick line portion in FIG. 13C) of the part which is to be formed into the third vertical wall part in the second step moves to the groove part 15 side and the stretch flanging deformation part 22e side as in the conventional method. That is, in the first step of the second embodiment, inflow of the material to the stretch flanging deformation part 22c is kept to the same extent as in the conventional example.

Meanwhile, the outer edge 22g (refer to the thick line portion in FIG. 13C) of the first vertical wall part moves inward. However, since only the second-end-part-side groove part 22a is formed in the first step of the second embodiment, the moving amount of the outer edge 22g decreases as compared with the conventional method. Consequently, according to the second embodiment, outflow of the material from the stretch flanging deformation part 22c is reduced as compared with the conventional method.

As above, in the second embodiment, inflow of the material to the stretch flanging deformation part 22c in the direction shown by the arrow to which shading is applied in FIG. 13C is kept at the same extent as compared with the conventional method. Further, outflow of the material from the stretch flanging deformation part 22c in the direction shown by the arrow to which cross-hatching is applied in FIG. 13C is reduced. As a result, stretch flanging deformation in the stretch flanging deformation part 22c is reduced, and occurrence of rupture in this part is suppressed.

In the case of the second embodiment, when a circle C is drawn centered at a point 22d that is located nearest to the second end part (the vehicle wheel attaching end part) side of the corner part of the first vertical wall part which is the stretch flanging deformation part in the first step, as shown in FIG. 13C, a part or a whole of the second-end-part-side groove part 22a is preferably located inside the circle C. Here, a radius [mm] of the circle C is 35% of a length [mm] of the main body part 11. The length of the main body part 11 is a distance [mm] in a straight line from the first end part (the vehicle body attaching end part) 11a to the second end part (the vehicle wheel attaching end part) 11b as shown in the FIG. 2 described above. In measurement of the length of the main body part 11, as respective positions of the first end part 11a and the second end part 11b, center points P1 and P2 in a width direction in the top plate part 13a of the main body part 11 are respectively adopted.

If a part or a whole of the second-end-part-side groove part 22a is located inside the circle C, inflow of the material to the stretch flanging deformation part 22c attributable to forming the second-end-part-side groove part 22a is promoted more effectively in the first step. As a result, stretch flanging deformation in the stretch flanging deformation part 22c is more reduced, and occurrence of rupture in this part is more suppressed. From the viewpoint of increasing the effect more, the radius of the circle C is preferably 30% of the length of the main body part 11.

Further, when a part or a whole of the second-end-part-side groove part 22a formed in the first step is located inside the circle C, an end part 22e of the second-end-part-side groove part 22a may be disposed on either of the first end part side and the second end part side, with the center point 22d of the circle C as a reference. However, if the end part 22e of the second-end-part-side groove part 22a is disposed at the first end part (the vehicle body attaching end part) side, there arises the fear of increasing outflow of the material from the stretch flanging deformation part 22c in the direction shown by the arrow to which cross-hatching is applied in FIG. 13C. Consequently, the end part 22e of the second-end-part-side groove part 22a is preferably disposed on the second end part (the vehicle wheel attaching end part) side from the center point 22d of the circle C.

As described above, suppression of rupture in the stretch flanging deformation part according to the production method of the second embodiment is by flow of the material in the first step. The mechanism of rupture suppression similarly applies to the second step.

[Press-Formed Product]

According to the production methods of the present embodiments described above, press-formed products in which rupture is suppressed in the stretch flanging deformation parts can be obtained even when a high-tensile strength steel plate with a tensile strength of 440 MPa-class is used as a blank metal plate. Consequently, the press-formed products of the present embodiments have a high strength, and rupture is suppressed in the stretch flanging deformation parts. A use purpose of the press-formed products is not limited as long as the press-formed products are in the shapes conforming to lower arms.

Further, according to the production methods of the present embodiments, stretch flanging deformation can be reduced in the stretch flanging deformation parts. Consequently, formed heights of the vertical wall parts of the press-formed products, in particular, formed heights of the corner parts of the first vertical wall parts which are to be the stretch flanging deformation parts can be made higher.

Here, a result of investigating a limit height capable of being formed by press-working will be shown, with respect to the height of the corner part of the first vertical wall part in a press-formed product. The limit forming height of the corner part was investigated for each of various steel plates with different tensile strengths in both the production method of the present embodiment and the conventional method. In the investigation, the actual values of the actual working tests conducted by the inventor and the result of FEM analysis were used.

Figure 14:
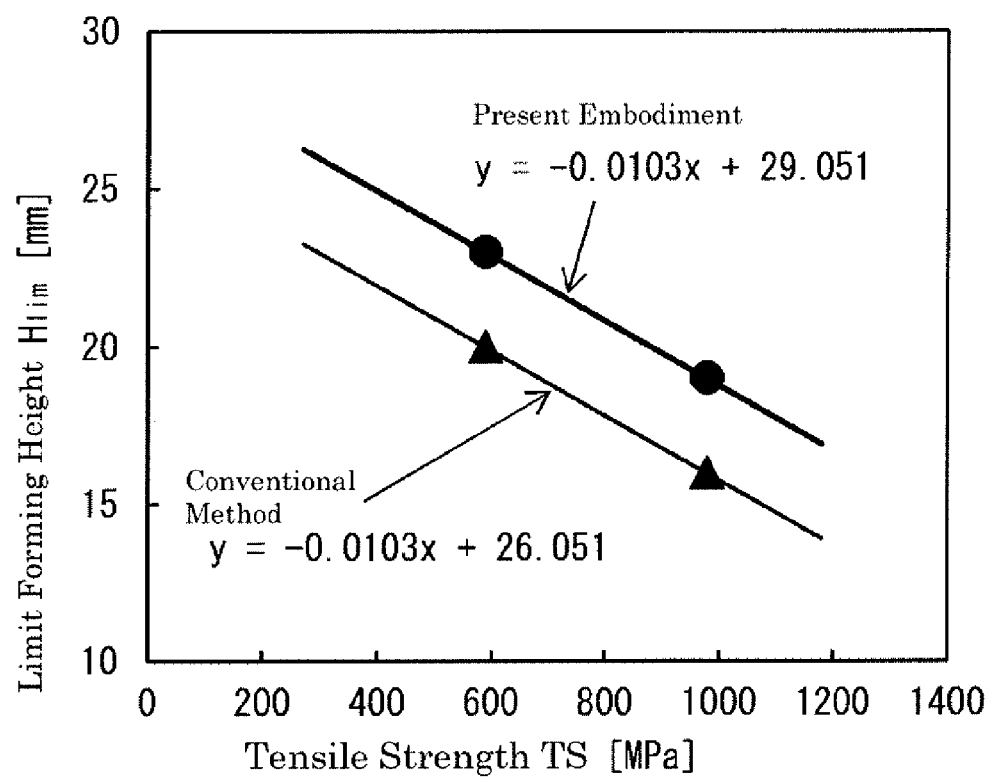
FIG. 14 is a diagram showing a relation between a tensile strength of a blank metal plate and a limit forming height by press-working.

FIG. 14 is a diagram showing a relation between a tensile strength of the blank metal plate and a limit forming height by press-working. FIG. 14 representatively shows a result of a case of using a steel plate of 590 MPa-class and a steel plate of 980 MPa-class. As shown in FIG. 14, a limit forming height H [mm] of the corner part reduces proportionally to a tensile strength TS [MPa] of the steel plate in both of the cases of the production method of the present embodiment and the conventional method. Especially in the case of the conventional method, a limit forming height $H_{lim}$ [mm] of the corner part is expressed by Formula (A) as follows.

$$H_{lim} = -0.0103 \times TS + 26.051 \quad (A)$$

Meanwhile, in the case of the production method of the present embodiment, the limit forming height $H_{lim}$ [mm] of the corner part is expressed by Formula (B) as follows.

$$H_{lim} = -0.0103 \times TS + 29.051 \quad (B)$$

From the relations of Formula (A) and Formula (B) described above, the limit forming height according to the production method of the present embodiment increases by approximately 3 mm as compared with the conventional method. That is, according to the production method of the present embodiment, the forming height of the corner part can be made higher than the limit forming height of the conventional method expressed by Formula (A) described above.

Accordingly, in the press-formed product of the present embodiment, a maximum height $H_{max}$ [mm] of the corner part of the first vertical wall part which is to be the stretch flanging deformation part can be made to satisfy Formula (1) as follows on the basis of Formula (A) described above. As a matter of course, the press-formed product of the present embodiment can be made the product having a tensile strength of 440 MPa or more.

$$H_{max} > -0.0103TS + 26.051 \quad (1)$$

EXAMPLES

In order to confirm the effect of the present invention, tests on example 1 and example 2 below were carried out by FEM analyses. In the FEM analyses of both of example 1 and example 2, press-formed products usable as lower arms were produced by applying press-working to blank metal plates, and degrees of stretch flanging deformation were evaluated by plate thickness decrease rates of the stretch flanging deformation parts at this time.

Example 1

In the test of example 1, a press-formed product in the shape of the first example shown in FIG. 1 described above was produced in order to confirm the effect of the first embodiment. The groove part of the press-formed product is provided in only the domain on the first end part side, in the surface of the top plate part of the main body part. At this time, a high-tensile strength steel plate with a plate thickness of 2.6 mm, and a tensile strength of 960 MPa-class was used as the blank metal plate.

In Inventive Example 1 of the present invention, the press dies shown in FIG. 10 and FIG. 6 described above were used, and press-working was applied to the blank metal plate by the first step shown in FIG. 9A and FIG. 9B described above, and the second step shown in FIG. 9B and FIG. 9C described above.

Figure 3A:
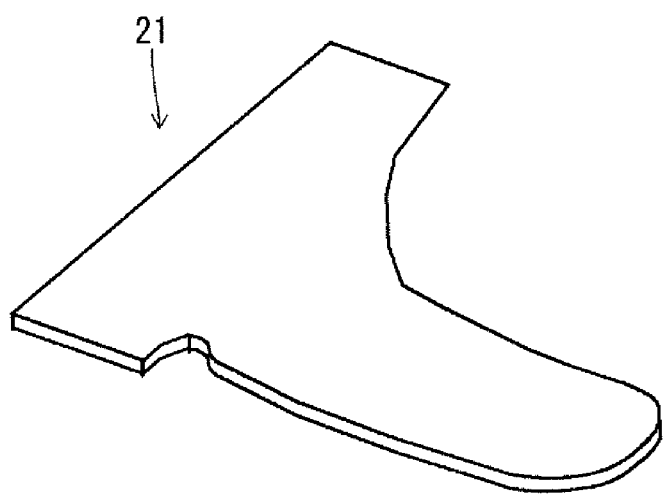
FIG. 3A relates to a press-formed product of a first example, is a perspective view for explaining an example of a production process step of a conventional method, and shows a shape of a blank metal plate.
Figure 3B:
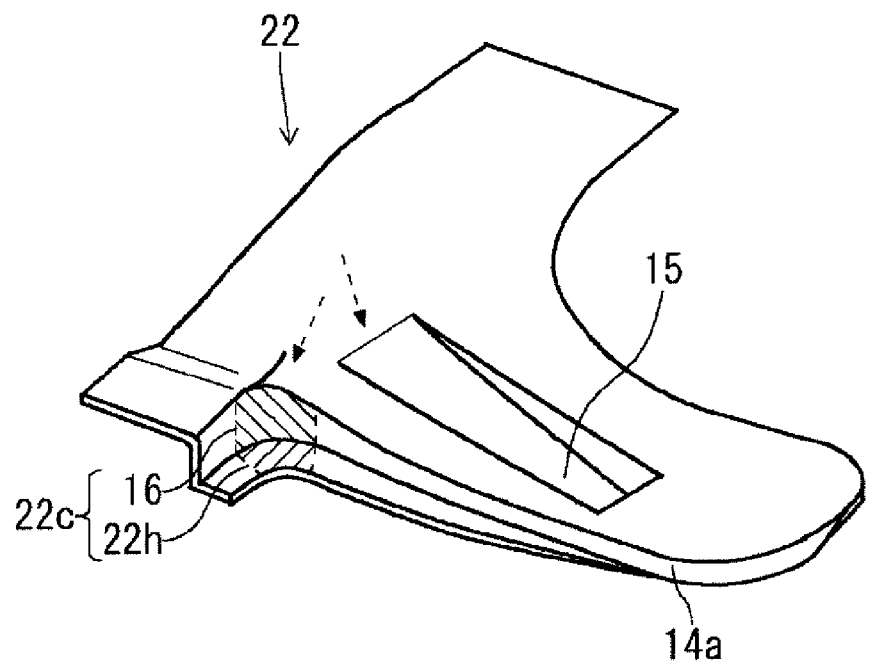
FIG. 3B relates to the press-formed product of the first example, is a perspective view for explaining an example of the production process step of the conventional method, and shows a shape of the metal plate after a first step.
Figure 3C:
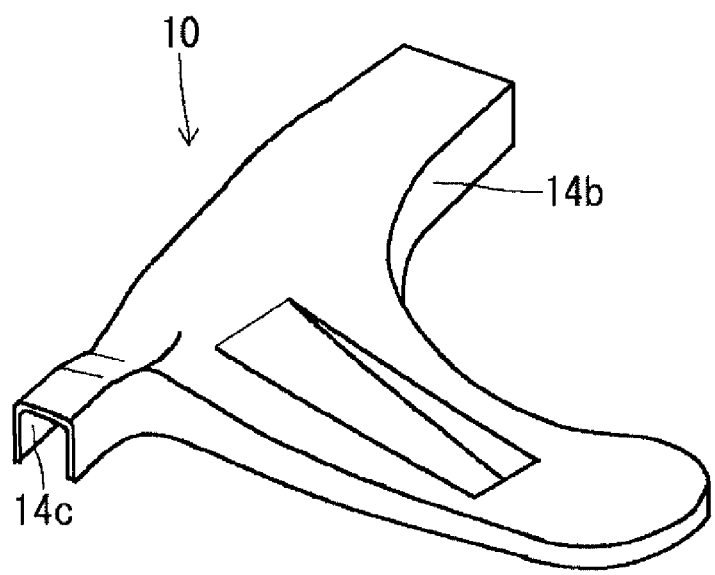
FIG. 3C relates to the press-formed product of the first example, is a perspective view for explaining an example of the production process step of the conventional method, and shows a shape of a press-formed product that is obtained by going through a second step.
Figure 5:
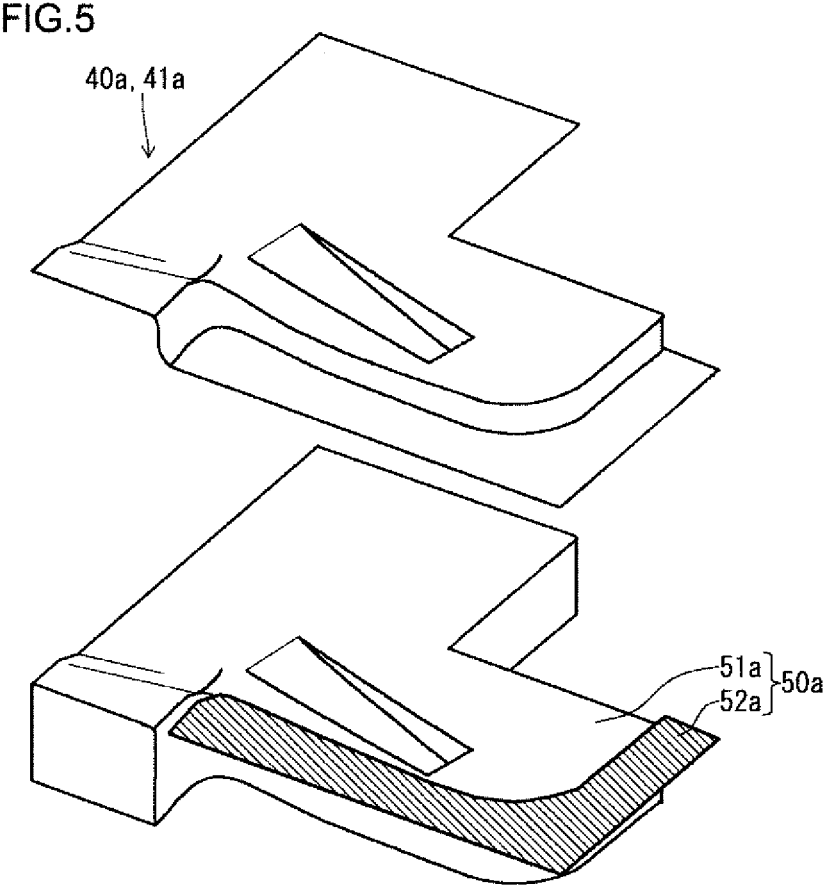
FIG. 5 relates to the press-formed product of the first example, and is a perspective view schematically showing a shape example of a press die that is used in the first step of the conventional method.

Meanwhile, in the conventional example 1, the press dies shown in FIG. 5 and FIG. 6 described above were used, and press-working was applied to the blank metal plate by the first step shown in FIG. 3A and FIG. 3B described above, and the second step shown in FIG. 3B and FIG. 3C described above. The other conditions were set as the same as in the Inventive Example 1 of the present invention.

In both of the Inventive Example 1 of the present invention and the conventional example 1, for the respective first steps and second steps, the plate thicknesses of the stretch flange parts were measured before and after the steps, and plate thickness reduction rates of the stretch flanging deformation parts were obtained. The plate thickness reduction rates here were set as the plate thickness reduction rates in the positions where the plate thicknesses were reduced most in domains of the stretch flanging deformation parts, that is, the maximum plate thickness reduction rates.

In the conventional example 1, a whole of the groove part was formed in the first step. As a result, the plate thickness reduction rates of the stretch flanging deformation part in the first step and the second step were respectively 11.6% and 33.5%.

In contrast with this, in the inventive Example 1 of the present invention, a whole of the groove part was formed in the second step, without forming the groove part in the first step. The plate thickness reduction rates of the stretch flanging deformation part in the first step and the second step were respectively 8.0% and 26.3%. That is, in the Inventive Example 1 of the present invention, readily producing of the stretch flanging deformation part was enhanced as compared with the conventional example 1.

From the above, it has become clear that according to the first embodiment, the stretch flanging deformation in the stretch flanging deformation part can be reduced, and rupture in the stretch flanging deformation part can be suppressed.

Example 2

In the test of example 2, the press-formed product in the shape of the second example shown in FIG. 2 described above was produced in order to confirm the effect of the second embodiment. The groove part of the press-formed product was provided in a wide-ranging domain from the first end part (the vehicle body attaching end part) to the second end part (the vehicle wheel attaching end part), of the surface of the top plate part of the main body part. At this time, a high-tensile strength steel plate with a plate thickness of 2.6 mm and a tensile strength of 980 MPa-class was used as the blank metal plate. A distance in a straight line from the first end part to the second end part of the main body part, that is, the length of the main body part was 400 mm.

In Inventive Example 2 of the present invention, press-working was applied to the blank metal plate by the first step shown in FIG. 11A and FIG. 11B described above, and the second step shown in FIG. 11B and FIG. 11C described above, by using the press dies shown in FIG. 12 and FIG. 8 described above. Trimming was applied to the resultant press-formed product. The point 22*d* located nearest to the second end part side in the corner part of the first vertical wall part which is to be the stretch flanging deformation part was set as a reference, and the end part 22*e* of the second-end-part-side groove part 22*a* which is formed in the first step was disposed on the second end part side from the reference point 22*d*. The shortest distance d (refer to FIG. 13C described above) between the second-end-part-side groove part 22*a* and the reference point 22*d* was set as 40 mm. Consequently, when a circle having a radius of 35% of the length (400 mm) of the main body part, that is, a circle having a radius of 140 mm was drawn centered at the reference point 22*d*, a part of the second-end-part-side groove part 22*a* was in a state located in the circle.

Figure 4A:
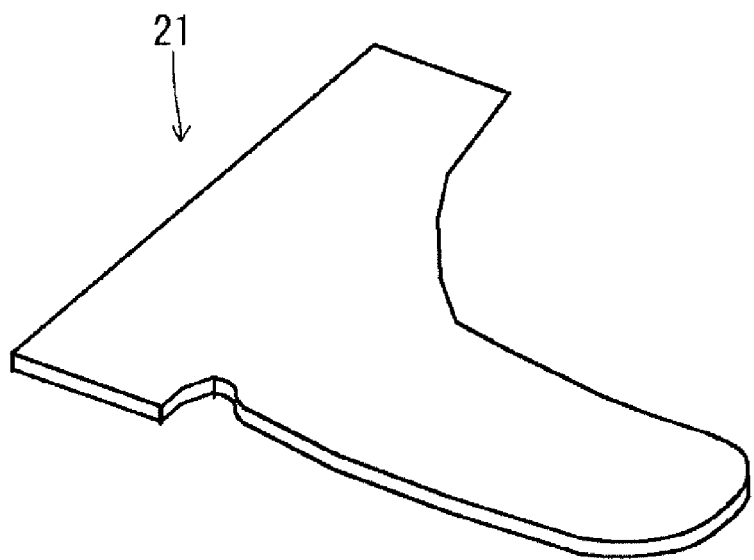
FIG. 4A relates to a press-formed product of a second example, is a perspective view for explaining an example of a production process step of a conventional method, and shows a shape of a blank metal plate.
Figure 4B:
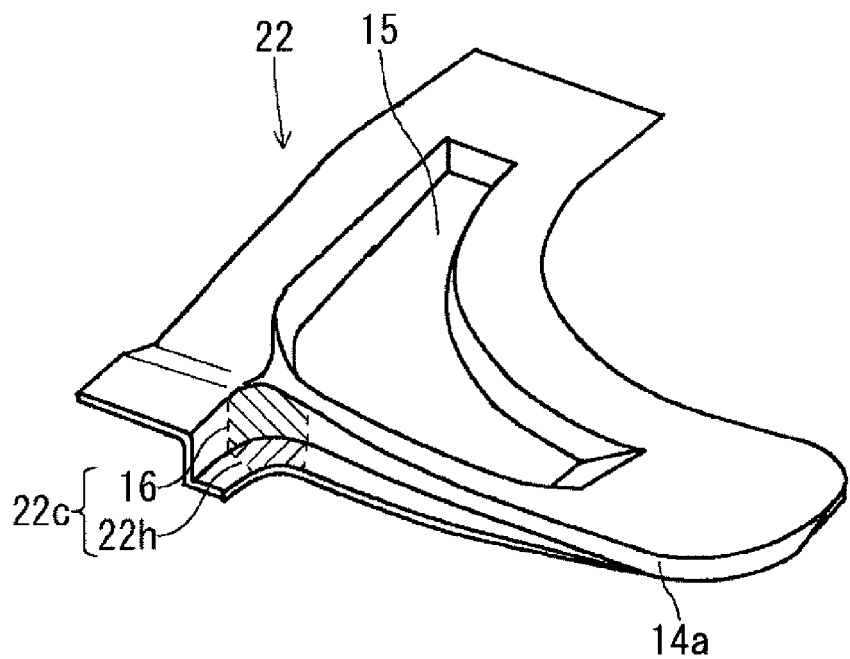
FIG. 4B relates to the press-formed product of the second example, is a perspective view for explaining an example of the production process step of the conventional method, and shows a shape of the metal plate after a first step.
Figure 4C:
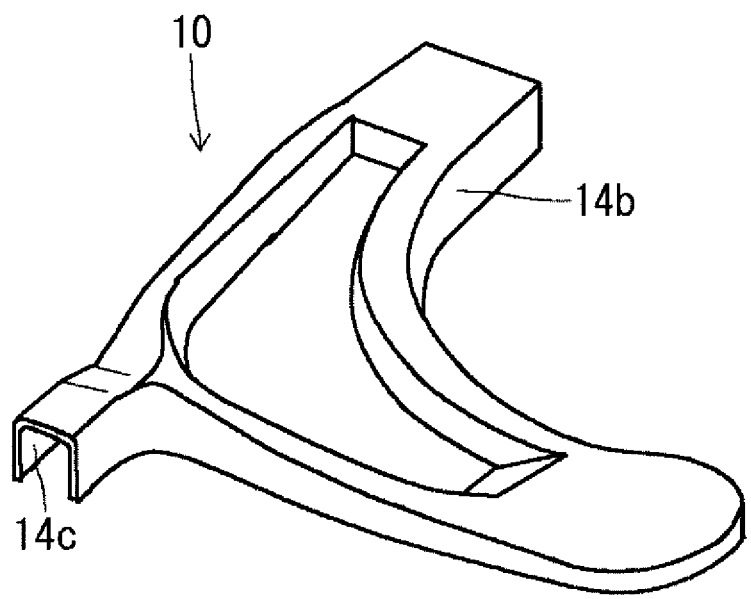
FIG. 4C relates to the press-formed product of the second example, is a perspective view for explaining an example of the production process step of the conventional method, and shows a shape of a press-formed product obtained by going through a second step.
Figure 7:
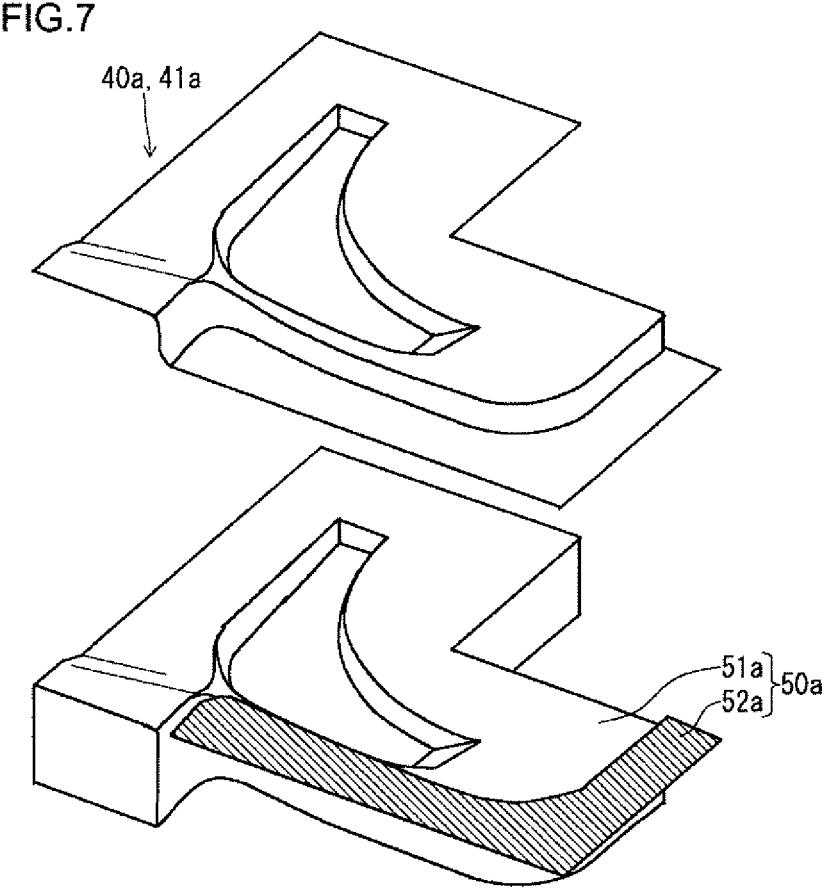
FIG. 7 relates to the press-formed product of the second example, and is a perspective view schematically showing a shape example of a press die that is used in the first step of the conventional method.

Meanwhile, in the conventional example 2, press-working was applied to the blank metal plate by the first step shown in FIG. 4A and FIG. 4B described above, and the second step shown in FIG. 4B and FIG. 4C described above, by using the press dies shown in FIG. 7 and FIG. 8 described above. Further, in Comparative Example 2 for reference, a whole of the groove part was formed in the second step without forming the groove part in the first step. The other conditions were set as the same as in the Inventive Example 2 of the present invention.

In each of the Inventive Example 2 of the present invention, the conventional example 2 and Comparative Example 2, for the respective first step, second step and trimming step, the plate thickness of the flange part was measured before and after the steps, and the plate thickness reduction rates of the stretch flanging deformation part were obtained. The plate thickness reduction rate in this case was the plate thickness reduction rate in the position where the plate thickness was most reduced in the domain of the stretch flanging deformation part, that is, the maximum plate thickness reduction rate. The test result is shown in Table 1 as follows.

TABLE 1

| Category | Formed part of groove part in first step | Plate thickness reduction rate of stretch flanging deformation part (%) | | |
|---|---|---|---|---|
| | | First step | Second step | Trimming step |
| Conventional example 2 | Whole | 17.9 | 33.3 | 24.9 |
| Comparative Example 2 | None | 28.6 | 38.5 | 29.7 |
| Inventive Example 2 of present invention | Second-end-part-side groove part | 14.7 | 26.5 | 14.7 |

From Table 1, the following is shown. In the conventional example 2, the whole of the groove part was formed in the first step. As a result, the plate thickness reduction rates of the stretch flanging deformation part in the first step, the second step and the trimming step were respectively 17.9%, 33.3% and 24.9%. In contrast with this, in the Comparative Example 2, the plate thickness reduction rates of the stretch flanging deformation part in the first step, the second step and the trimming step were all worsened.

In the Inventive Example 2 of the present invention, the second-end-part-side groove part of the groove part was formed in the first step, and the remaining first-end-part-side groove part was formed in the second step. As a result, the plate thickness reduction rates of the stretch flanging deformation part in the first step, the second step and the trimming step were respectively 14.7%, 26.5% and 14.7%. That is, in the Inventive Example 2 of the present invention, formability of the stretch flanging deformation part was enhanced as compared with the conventional example 2.

From the above, it has become clear that according to the second embodiment, the stretch flanging deformation in the stretch flanging deformation part can be reduced, and rupture in the stretch flanging deformation part can be suppressed.

Further, it is needless to say that the present invention is not limited to the above described embodiments, and various changes can be made within the range without departing from the spirit of the present invention.

INDUSTRIAL APPLICABILITY

The production method of a press-formed product of the present invention is useful in production of a press-formed product in the shape conforming to an automobile lower arm. In particular, the production method of the present invention is useful for production of a lower arm with a high strength and a high rigidity.

REFERENCE SIGNS LIST

10: Press formed product (lower arm), 11: Main body part,
11a: First end part of main body part (vehicle body attaching end part),
11b : Second end part of main body part (vehicle wheel attaching end part)
12: Protruded part,
13a : Top plate part of main body part, 13b : Top plate part of protruded part,
14a: Vertical wall part (first vertical wall part) extending from first end part (vehicle body attaching end part) of main body part to protruded part,
14b : Vertical wall part (second vertical wall part) extending from first end part (vehicle body attaching end part) of main body part to second end part (vehicle wheel attaching end part) of main body part,
14c : Vertical wall part (third vertical wall part) extending from second end part (vehicle wheel attaching end part) of main body part to protruded part,
15: Groove part, 16: Corner part,
17: Ridge formed by first vertical wall part and top plate part,
21: Blank metal plate, 22: Metal plate after first step,
22a : Part (second-end-part-side groove part) on second end part (vehicle wheel attaching end part) side of groove part, 22c : Stretch flanging deformation part,
22d : Point located nearest to second end part (vehicle wheel attaching end part) side in corner part
22e : End part of second-end-part-side groove part,
22f : Outer edge of part formed into third vertical wall part,
22g : Outer edge of first vertical wall part, 22h: Outer side domain of corner part,
40a to 40c: Upper die, 41a to 41c : Die, 42b : Pad,
50a to 50c: Lower die, 51a to 51c : Punch,
52a, 52c: Blank holder, B: Vehicle body side, W: Vehicle wheel side

The invention claimed is:

1. A method for producing a press-formed product from a blank metal plate,
wherein the press-formed product includes a main body part that bends along a lengthwise direction in plan view and has a first end part and a second end part respectively on both ends of the main body part, and a protruded part that protrudes outward of bending from a bent part of the main body part,
the main body part and the protruded part each comprise top plate parts and vertical wall parts each extending from opposite sides of the top plate parts,
a groove part along the lengthwise direction of the main body part is provided on a surface of the top plate part of the main body part,
among the vertical wall parts, the vertical wall part extending from the first end part of the main body part to the protruded part has a corner part connecting the main body part and the protruded part, and
in a ridge part formed by the top plate part and the vertical wall part extending from the first end part of the main body part to the protruded part, an angle that is formed by a part which is on the main body side from the corner part and a part which is on the protruded part side from the corner part is an acute angle,
the method for producing the press-formed product comprising: a first step; and a second step,
wherein in the first step, by applying press-working to the blank metal plate, a surface shape on the second end part side from the bent part of the main body part is formed, in a surface shape of the top plate part, and further the vertical wall part extending from the first end part side of the main body part to the protruded part is formed, and
in the second step, a surface shape on the first end part side from the bent part of the main body part is formed, in the surface shape of the top plate part, by applying press-working to the blank metal plate after the first step.

2. The method for producing a press-formed product according to claim 1,
wherein the groove part of the press-formed product is provided in a domain from the first end part to the second end part so as to pass through a root of the protruded part, in the surface of the top plate part of the main body part,
in the first step, a part on the second end part side of the groove part is formed, and
in the second step, a part on the first end part side of the groove part is formed.

3. The method for producing a press-formed product according to claim 2,
wherein in the first step, when a circle having a radius of 35% of a length of the main body part is drawn centered at a point that is located nearest to the second end part side in the corner part, a part or a whole of a portion on the second end part side of the groove part is located in the circle.

4. The method for producing a press-formed product according to claim 1,
wherein the groove part of the press-formed product is provided in a domain on the first end part side from a root of the protruded part, in the surface of the top plate part of the main body part,
the groove part is not formed in the first step, and
the groove part is formed in the second step.

5. The method for producing a press-formed product according to claim 1,
wherein the press-formed product is an automobile lower arm,
the first end part and the protruded part of the main body part are attached to a vehicle body of an automobile, and
the second end part of the main body part is attached to a vehicle wheel of the automobile.

6. An automobile lower arm formed from a blank metal plate by press-working,
the lower arm, comprising: a main body part that bends along a lengthwise direction in plan view and has a vehicle body attaching end part and a vehicle wheel attaching end part respectively on both ends of the main body part; and a vehicle body attaching protruded part that protrudes outward of bending from a bent part of the main body part,
wherein the main body part and the protruded part each comprise top plate parts, and vertical wall parts each extending from opposite sides of the top plate parts,
a groove part along the lengthwise direction of the main body part is provided on a surface of the top plate part of the main body part,
among the vertical wall parts, the vertical wall part extending from the vehicle body attaching end part of the main body part to the protruded part has a corner part connecting the main body part and the protruded part, and in a ridge part formed by the top plate part and the vertical wall part extending from the vehicle body attaching end part of the main body part to the protruded part, an angle that is formed by a part which is on the main body part side from the corner part and a part which is on the protruded part side from the corner part is an acute angle, a tensile strength TS [MPa] of the automobile lower arm is 440 MPa or more, and a maximum height $H_{max}$ [mm] of the corner part of the vertical wall part satisfies Formula (1) as follows:

$$H_{max} > -0.0103 \times TS + 26.051 \qquad (1).$$

7. The method for producing a press-formed product according to claim 2, wherein the press-formed product is an automobile lower arm, the first end part and the protruded part of the main body part are attached to a vehicle body of an automobile, and the second end part of the main body part is attached to a vehicle wheel of the automobile.

8. The method for producing a press-formed product according to claim 3, wherein the press-formed product is an automobile lower arm, the first end part and the protruded part of the main body part are attached to a vehicle body of an automobile, and the second end part of the main body part is attached to a vehicle wheel of the automobile.

9. The method for producing a press-formed product according to claim 4, wherein the press-formed product is an automobile lower arm, the first end part and the protruded part of the main body part are attached to a vehicle body of an automobile, and the second end part of the main body part is attached to a vehicle wheel of the automobile.

\* \* \* \* \*